United States Patent
Pietsch et al.

(10) Patent No.: US 6,837,048 B2
(45) Date of Patent: Jan. 4, 2005

(54) TANDEM MASTER CYLINDER

(75) Inventors: Christoph Pietsch, Montesson (FR); Yannick Nen, La Varenne St Hilaire (FR); Henry Pagot, Villetaneuse (FR); Christoph Nehr, Hanvoile (FR); Raynald Sprocq, Vaires sur Marne (FR); Omar Brahmi, Saint Martin du Tertre (FR); Jean-Yves Dreo, Fouquenies (FR)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 10/394,602

(22) Filed: Mar. 21, 2003

(65) Prior Publication Data

US 2003/0178262 A1 Sep. 25, 2003

(30) Foreign Application Priority Data

Mar. 21, 2002 (FR) .......................................... 02 03585

(51) Int. Cl.[7] .................................................. F15B 7/08
(52) U.S. Cl. .......................................... 60/588; 60/589
(58) Field of Search ........................... 60/588, 589, 590

(56) References Cited

U.S. PATENT DOCUMENTS 5,647,213 A * 7/1997 Kaub et al. ................... 60/589

* cited by examiner

*Primary Examiner*—F. Daniel Lopez
(74) *Attorney, Agent, or Firm*—Leo H. McCormick, Jr.; Warren Comstack

(57) ABSTRACT

A master cylinder having a body with a bore therein delimited by a piston into a work chamber and a supply chamber. The work chamber (16) is connected to wheel brakes, while the supply chamber is connected to a fluid supply, through a supply duct. The piston has a shank retained by a guide ring mounted in the bore and a head bears against a thrust ring in a rest position. A first end of the supply duct is connected to the fluid supply, while a end is connected to the supply chamber. A hydraulic damping arrangement that dampens movement of the piston toward the thrust ring and includes structure for shutting off the second end of the supply duct such that brake fluid flows at a reduced flow rate from the supply chamber to the supply duct through at least one exhaust duct.

22 Claims, 19 Drawing Sheets

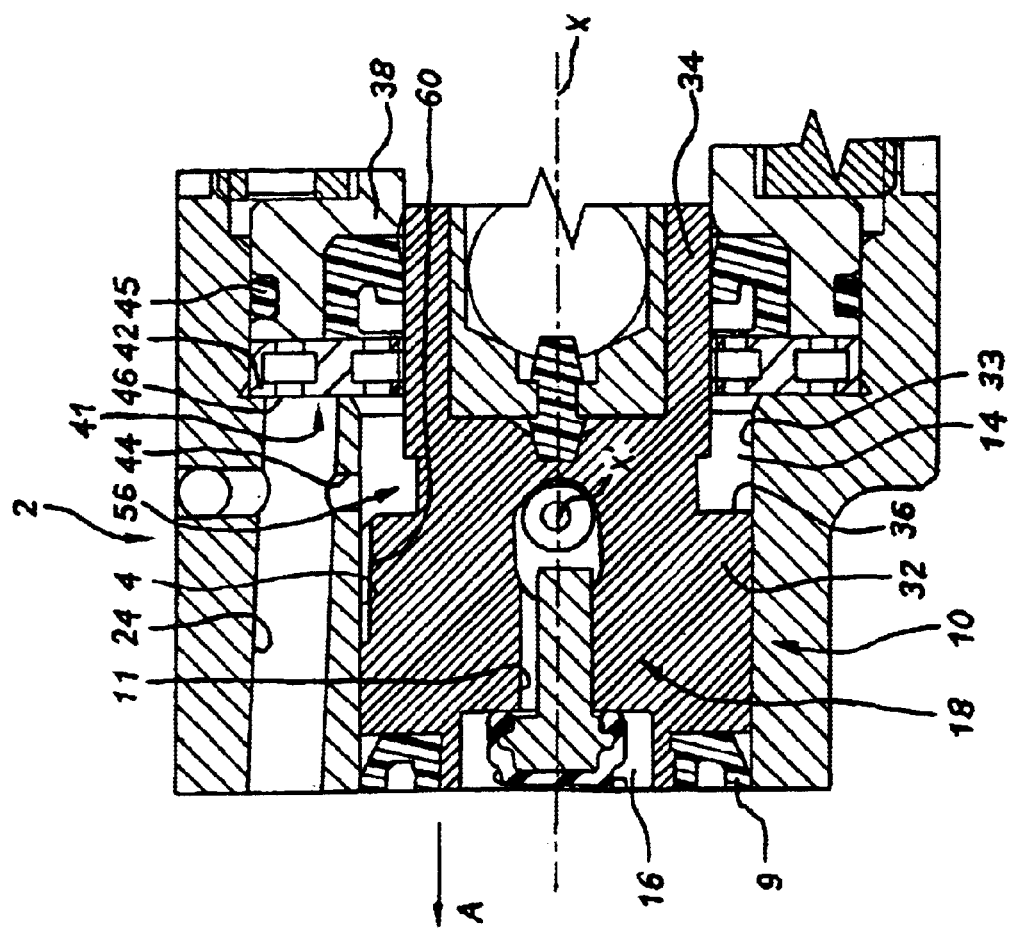

TANDEM MASTER CYLINDER

The present invention relates mainly to a master cylinder, particularly a tandem master cylinder with lower operating noise, particularly at the end of the braking phase, and to a braking system comprising such a master cylinder.

BACKGROUND OF THE INVENTION

Master cylinders of known type comprise a body pierced with a bore in which is mounted to slide with sealing at least one piston connected to a control member, the piston dividing the bore into a supply chamber supplied by a reservoir of brake fluid by means of a supply duct made in the body of the master cylinder and a work chamber in communication with brakes situated at the wheels. The piston in its central part has a passage for communication between the supply chamber and the work chamber, this passage being fitted with a valve that is open at rest and that shuts off the passage between the supply chamber and the work chamber during the braking phase. The piston also has a piston head facing toward the work chamber and a piston shank receiving the control member of the master cylinder, the piston shank being connected to the piston head by a shoulder running radially outward and forming a surface via which the piston bears, at rest, against a thrust ring, the thrust ring surrounding the piston shank.

At the end of the braking phase, the piston, under the action of a return spring arranged in the work chamber, is pushed back toward the control member and strikes the thrust ring, causing a noise annoying to the driver who might fear that his braking system is malfunctioning. At the same time, the brake fluid flows from the supply chamber toward the tank between the body of the master cylinder and the thrust ring.

This noise problem occurs particularly in electro-hydraulic braking systems comprising a master cylinder actuated by a control member, equipped with means for simulating the pedal feel and serving in normal operation to simulate the reaction of the braking circuit, and a computer detecting the movement of the control member and generating a signal commanding a hydraulic pump to send a certain volume of brake fluid to the brakes. What happens is that electro-hydraulic systems are more sensitive to this noise because, unlike conventional braking systems, they have no pneumatic brake booster positioned between the brake pedal and the master cylinder and which, at the end of braking, slows the return of the piston of the master cylinder and therefore attenuates the noise. In addition, in the case of a tandem master cylinder, it is particularly the piston of the primary hydraulic circuit which is responsible for this noise.

In order to reduce this noise, it has been proposed, for example, that the thrust ring be covered with an elastomer so as to damp the impact of the piston against the washer. However, this solution is not entirely satisfactory.

Unpublished French Patent FR 01/13 073 proposes, by way of a solution, arranging a flow restrictor in the supply duct to slow the flow of the brake fluid from the supply chamber to the reservoir as the piston returns, and thus forming a hydraulic damper. However, this solution has a high cost because it entails an additional part. In addition, fitting this restrictor in the supply duct carries the risk of causing possible contamination which may disturb the operation of the master cylinder, for example the sealing of the sliding of the master cylinder in the bore.

SUMMARY OF THE INVENTION

It is therefore an object of the present invention to offer a master cylinder with a low operating noise and a low cost.

It is another object of the present invention to offer a master cylinder with a low operating noise and which is simple to assemble.

These objects are achieved through a master cylinder comprising at least one piston sliding with sealing in a chamber and bearing, at rest, against a thrust ring, a work chamber and a supply chamber which are separated by the piston, the supply chamber being supplied by a reservoir of brake fluid via a supply duct, the master cylinder also comprising a means for shutting off in a more or less sealed manner a second longitudinal end of the supply duct which is the opposite end to a first end of the supply duct that is connected in a sealed manner to the reservoir, the shut-off means preventing brake fluid from flowing between the duct and the supply chamber via the second longitudinal end and comprising at least one exhaust duct through which brake fluid can escape at low flow rate from the supply chamber toward the supply duct.

In other words, the shut-off means which, for example, is formed of the thrust ring, forces the brake fluid as the piston returns to flow from the supply chamber to the supply duct through the reduced-flow exhaust ducts, slowing the speed of the piston at the end of its travel as it comes into contact with the thrust ring.

The main subject of the present invention is a master cylinder comprising a body of longitudinal axis pierced with a bore of axis, at least one piston mounted to slide with sealing in the said bore, the piston comprising a piston head and a piston shank connected to the piston head via a shoulder, the said piston shank being guided by a guide ring mounted fixedly in the piston body, the piston head coming at rest to bear against a thrust ring via the shoulder, the said piston delimits a work chamber able to contain a pressurized brake fluid and in communication with the brakes and a supply chamber placed in communication at rest with the said work chamber by a valve device arranged in the body of the piston, a supply duct comprising a first longitudinal end connected with sealing to a brake fluid reservoir and a second longitudinal end at the opposite end to the first end facing the thrust ring and allowing the supply chamber to be supplied with brake fluid via a resupply duct and hydraulic damping means for damping the return of the piston head to bear against the thrust ring, characterized in that these hydraulic damping means comprise a means for shutting off, in a practically sealed manner, the second longitudinal end of the supply duct and at least one exhaust duct through which the brake fluid can flow at a reduced flow rate from the supply chamber to the supply duct.

Another subject of the invention is a master cylinder, characterized in that the said shut-off means is formed by a face of the thrust ring.

Another subject of the invention is a master cylinder, characterized in that the damping means comprise a longitudinal cut-out made on the external periphery of the piston head and in that the said cut-out extends over the exterior periphery of the piston head starting from the shoulder made on the piston over a distance at least equal to the length between a face of the thrust ring able to come into contact with the piston and the resupply duct.

Another subject of the invention is a master cylinder, characterized in that the cut-out is formed of at least one flat.

Another subject of the invention is a master cylinder, characterized in that the piston comprises two radially opposed flats.

Another subject of the invention is a master cylinder, characterized in that the depth of the flat is between 0.1 mm and 1 mm.

Another subject of the invention is a master cylinder, characterized in that the cut-out is formed of at least one longitudinal duct.

Another subject of the invention is a master cylinder, characterized in that the cut-out is formed of five longitudinal ducts uniformly angularly distributed over a portion of the periphery of the piston head.

Another subject of the invention is a master cylinder, characterized in that the cut-out is formed of two sets of five ducts which are radially opposed.

Another subject of the invention is a master cylinder, characterized in that the cut-out is formed by a variation of the diameter of a portion of the piston head.

Another subject of the invention is a master cylinder, characterized in that the cut-out has at least two sections the diameters of which increase in the direction toward the opposite end of the piston head to the longitudinal end of the piston head that is connected to the piston shank.

Another subject of the invention is a master cylinder, characterized in that the hydraulic damping means comprise a roughly radial duct connecting the supply chamber and the exterior periphery of the piston head, the said duct opening more or less facing the resupply duct when the piston is bearing against the thrust ring.

Another subject of the invention is a master cylinder, characterized in that the duct opens into a pan made on the exterior periphery of the piston.

Another subject of the invention is a master cylinder, characterized in that the damping means comprise an exhaust duct arranged along the longitudinal axis between the supply chamber and the supply duct, made more or less at right angles to the axis of the master cylinder between the resupply duct and the shut-off means and of a diameter markedly smaller than the diameter of the resupply duct.

Another subject of the invention is a master cylinder, characterized in that the diameter of the exhaust duct is between 0.1 mm and 1 mm, and in that the diameter of the resupply duct is between 2 mm and 4 mm.

Another subject of the invention is a master cylinder, characterized in that the said exhaust duct is made in the body of the master cylinder and part of which is formed by the shut-off means.

Another subject of the invention is a master cylinder, characterized in that the damping means comprise a duct formed by a radial groove made on a face of the thrust ring at rest in contact with the piston facing the second longitudinal end of the supply duct.

Another subject of the invention is a master cylinder, characterized in that it comprises second hydraulic damping means arranged between the work chamber and the supply chamber.

Another subject of the invention is a master cylinder, characterized in that the second hydraulic damping means are formed of a shut-off piece comprising a duct facing the bore for communication between the supply chamber and the work chamber, the said second means being arranged in the piston head forward of the valve device.

Another subject of the invention is a master cylinder, characterized in that the said shut-off piece forms a thrust piece for a return spring of the master cylinder valve.

Another subject of the invention is a master cylinder, characterized in that the duct is formed by two cones connected by their vertex of longitudinal axis.

Another subject of the invention is a master cylinder, characterized in that in normal operation it is connected to means for simulating the reaction of a braking circuit, and in degraded operation is connected to wheel brakes.

Another subject of the invention is a braking system comprising a master cylinder according to the present invention.

The main subject of the invention is an electro-hydraulic braking system, comprising a brake member of the brake pedal type, means for detecting the movement of the said brake pedal, a computer producing a control setpoint for a hydraulic pump delivering brake fluid to at least one brake arranged at a wheel of the vehicle following detection, by the detection means, of an action by the driver on the brake member, characterized in that it also comprises a master cylinder according to the present invention.

The present invention will be better understood with the aid of the following description and of the attached drawings for which front and rear correspond respectively to the left and to the right in the drawings.

BRIEF DESCRIPTION OF THE DRAWINGS

FIGS. 5A to 5C are detailed views in longitudinal section of a first example of a third embodiment of a master cylinder according to the present invention, respectively in successive positions of the primary piston, during the braking phase, at the end of braking, and at rest;

DETAILED DESCRIPTION OF THE INVENTION

The same references will be used to denote, within the master cylinders according to the present invention, elements which have more or less the same shape and more or less the same function.

Figure 1A:
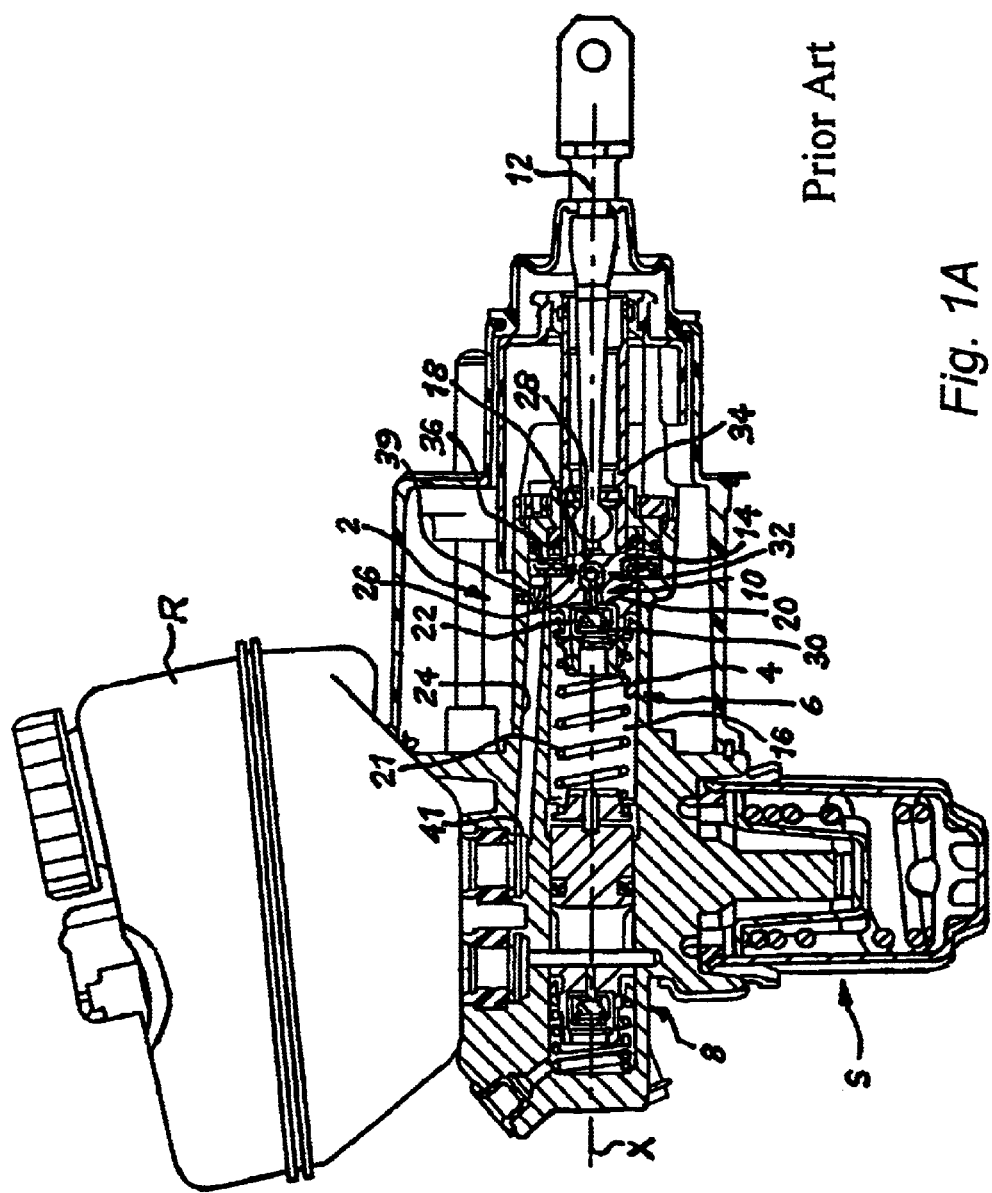
FIG. 1A is a view in longitudinal section of a master cylinder comprising hydraulic damping means of known type.

FIG. 1 shows a master cylinder of known type for an electro-hydraulic braking system comprising a body 2 of longitudinal axis X comprising a bore 4 divided into a primary circuit 6 and a secondary circuit 8. The primary and secondary circuits 6, 8 have more or less equivalent structures, and so we shall describe only the primary circuit. The primary circuit 6 comprises a piston 10 mounted to slide with sealing in the bore 4, the piston 10 being actuated by a control member, for example an actuating rod 12, connected to a brake pedal (not depicted). The primary circuit 6 also comprises a supply chamber 14 situated to the rear of the hydraulic piston 10 and directed toward the actuating rod 12 relative to the piston 10 in the bore 4 and a work chamber 16 arranged in front of the hydraulic piston 10 in the bore 4. The work chamber 16 and the supply chamber 14 are placed in communication via a valve system 18 arranged more or less in the central part of the piston 10. The valve 18 comprises a valve seat 20 bordering a duct passing longitudinally through the piston 10 and a shutter 22 in a raised position at rest with respect to the valve seat 20, and placing the supply chamber and the work chamber in communication. A return spring 21 for returning the piston 10 is mounted in compression in the work chamber 16, bearing against the piston 10.

During a braking phase, the valve 18 is closed and allows the pressure in the work chamber to rise through the advance of the piston 10 in the work chamber. The supply chamber 14 is connected to a reservoir R of brake fluid by sealed means of communication formed, in part, of a supply duct 24 made in the upper part of the body of the master cylinder. The shutter 22 comprises a stem 26 which at rest bears against a thrust piece 28, for example a pin mounted more or less at right angles to the axis X in the supply chamber. A return means 30 arranged in front of the shutter allows the valve to be closed in the braking phase.

Figure 1B:
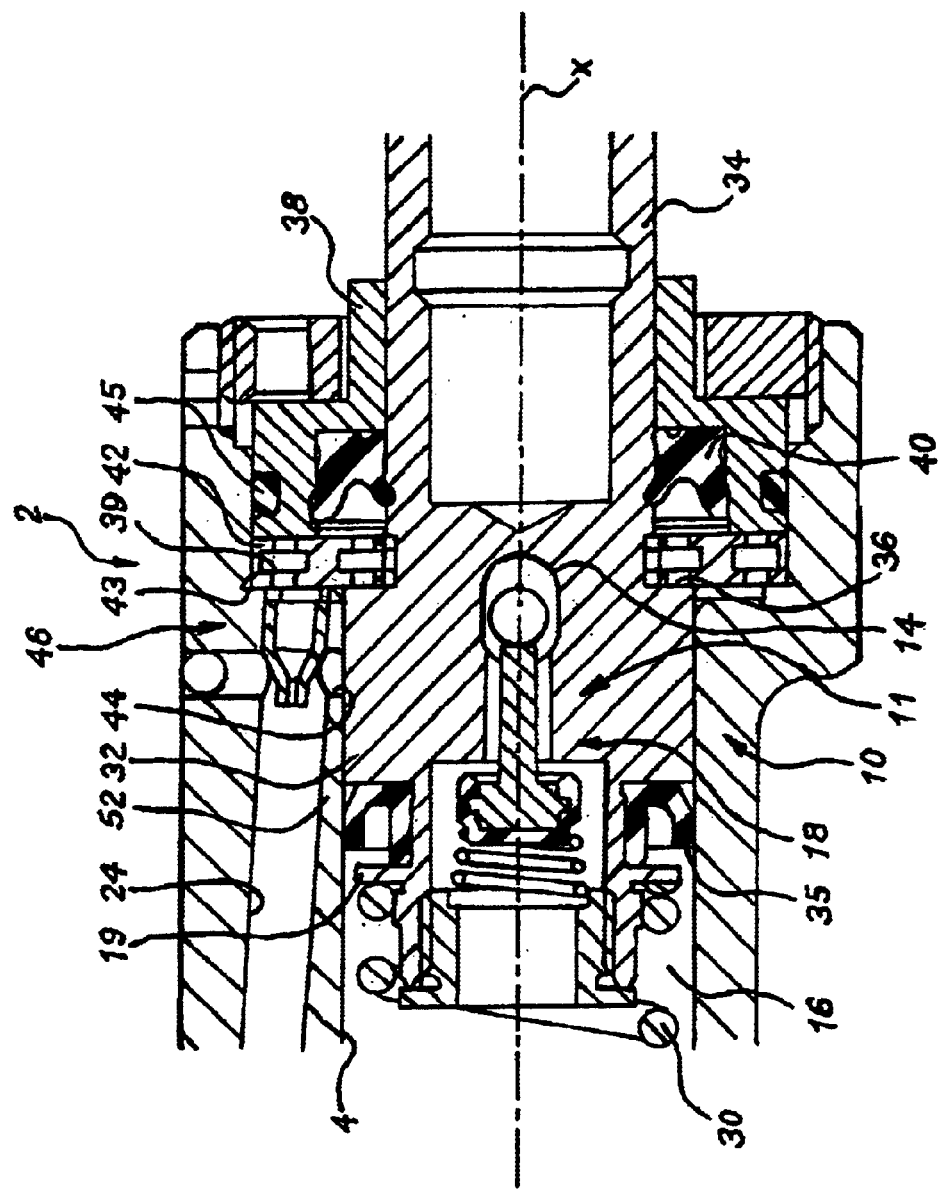
FIG. 1B is a detailed view of FIG. 1A.

Toward the front the primary piston 10 comprises a piston head 32 and a piston shank 34 facing toward the rear and connected to the piston head by a shoulder 36. Sealing means 35, for example a lip seal surrounding the piston head 32 of the piston 10 in contact with the internal surface of the bore 4 and provides sealing between the work chamber 16 and the supply chamber 14. The piston 10 is guided in translation in a sealed manner by a guide ring 38 surrounding the piston shank 34, the sealed sliding is achieved via sealing means 40, for example lip seals, held by the guide ring, itself mounted with sealing in the body of the master cylinder via sealing means, for example O-ring seals. The position at rest of the primary piston 10 is defined by a stop formed by a thrust ring 42 collaborating with the shoulder 36 formed on the exterior periphery of the piston 10 and mounted to bear between the guide ring 38 and the body of the master cylinder without shutting off a first roughly longitudinal end 39 of the supply duct 24, which is the opposite end to a second end 37 facing toward the reservoir, for example the thrust ring 42 bears against a shoulder 43 formed in the body of the master cylinder in such a way as to form a passage between the thrust ring 42 and the body of the master cylinder between the supply duct 24 and the supply chamber 14 (FIG. 1b). The body of the master cylinder also comprises a resupply duct 44 made more or less at right angles to the axis X between the bore 4 and the supply duct 24.

The master cylinder also comprises means S of simulating the pedal feel, which means are formed of a cartridge comprising elastic means reproducing the reaction of a conventional brake circuit. The inside of the cartridge is placed in communication with the work chamber 16 in normal operation. In degraded operation, for example when the computer or pump is out of action, the work chamber 16 is in direct communication with the brakes and sends pressurized brake fluid to the brakes.

The secondary circuit also comprises a work chamber which in degraded operation supplies different brakes from those supplied by the work chamber 16 of the primary circuit. However, in normal operation, the secondary work chamber is isolated both from the brakes and from the pedal feel simulation cartridge.

The master cylinder also comprises a hydraulic damping means formed of a sleeve 46 arranged in the supply duct 24 forward of the thrust ring 42 and locally reducing the diameter of the supply duct 24 and therefore the speed at which the brake fluid flows between the supply chamber and the work chamber.

We shall now briefly describe the return of the primary hydraulic piston 10 to the rest position in abutment against the thrust ring in order to explain the way in which the noise dampers of known type work.

At the end of the braking phase the driver releases his action on the brake pedal, the primary piston 10 retreats, toward the actuating rod 12, under the action of the spring 21 and nears the thrust ring 42. The brake fluid therefore flows from the supply chamber 14 toward the reservoir R via the supply duct 24 between the thrust ring 42 and the body of the master cylinder at the first longitudinal end 39 of the supply duct 24. Because of the presence of the flow restrictor 46 arranged in the supply duct 24, the rate of flow of brake fluid toward the reservoir is reduced, and this slows the return of the piston and damps the impact between the piston and the ring, thus reducing noise.

Figure 2A:
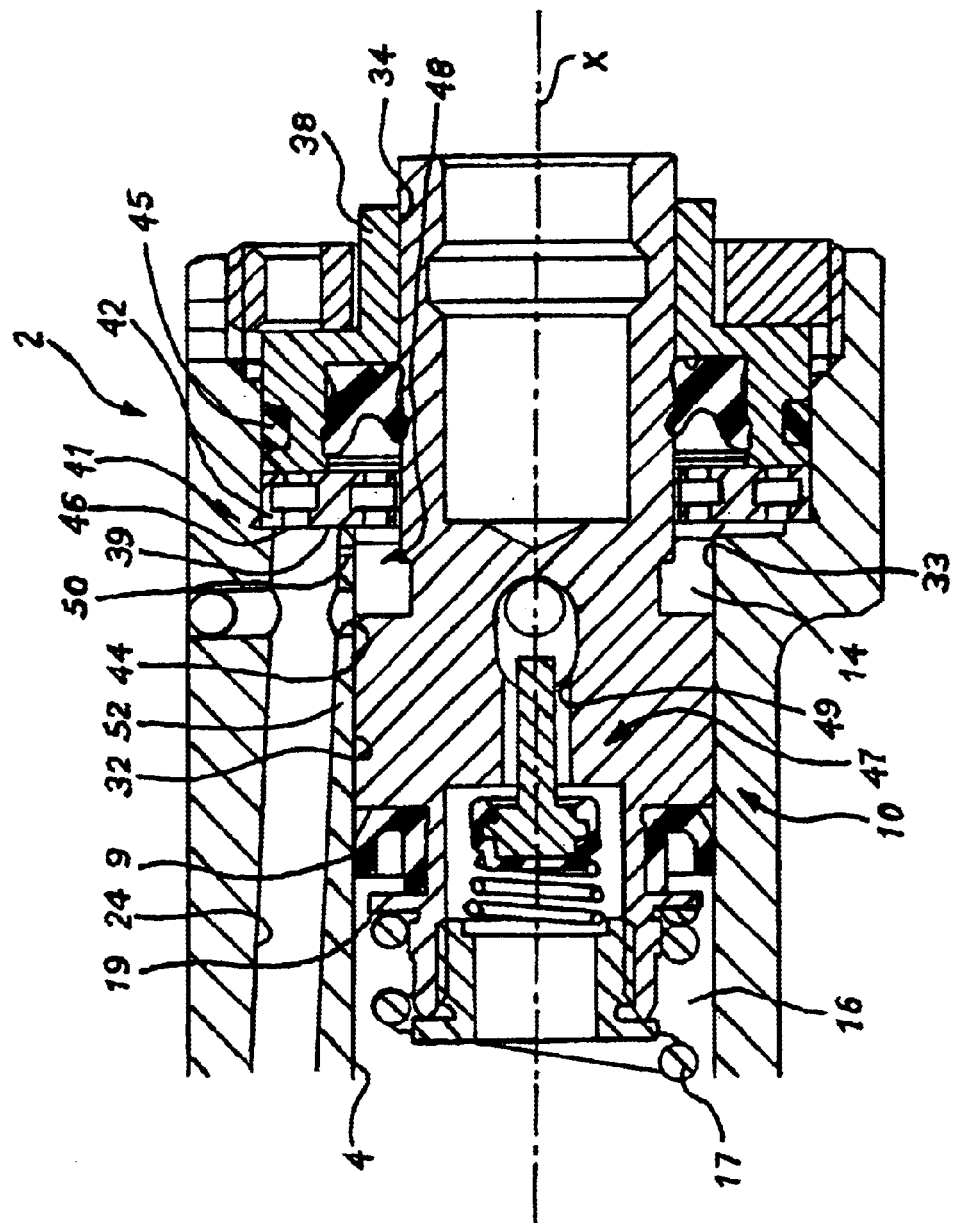
FIGS. 2A to 2C are detailed views in longitudinal section of a first example of a first embodiment of a master cylinder according to the present invention, depicted respectively in successive positions of the primary piston, during the braking phase, at the end of braking, and at rest.
Figure 2B:
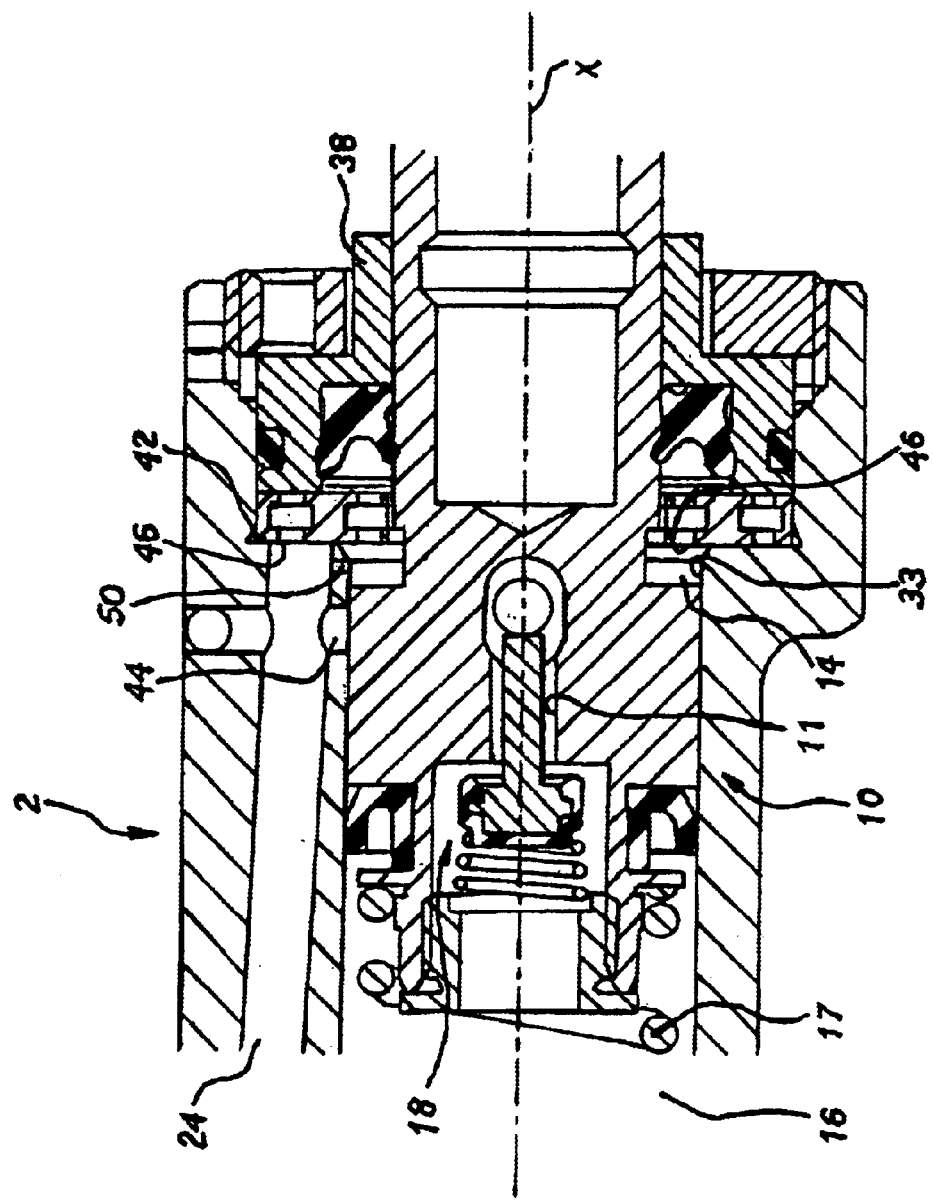
Figure 2C:
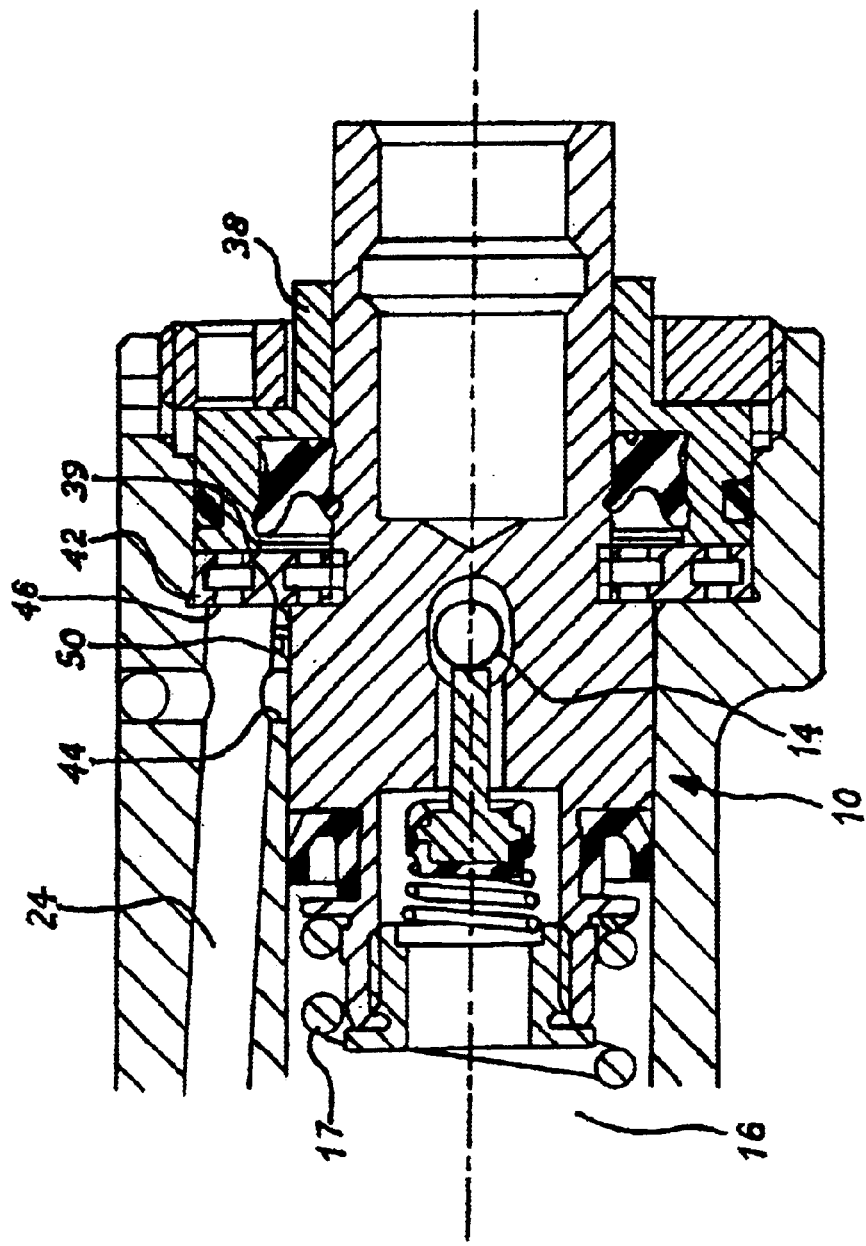

FIGS. 2A, 2B and 2C show a first example of a first embodiment of a master cylinder according to the present invention comprising a body 2 of longitudinal axis X pierced with a bore 4 in which there is mounted to slide with sealing at least one hydraulic piston 10 actuated by an actuating rod connected to a brake pedal (neither depicted). The sliding of the piston 10 is sealed, for example, by a lip seal 9 mounted fixedly on a front end of the piston 10. The piston 10 divides the bore 4 into a supply chamber 14 supplied with brake fluid by a brake fluid reservoir (not depicted) by means of a supply duct 24, and a work chamber 16 in communication in normal operation with brakes arranged at the wheels (not depicted). The piston 10 comprises, toward the front, a piston head 32 and, toward the rear, a piston shank 34, the sliding of the piston 10 being guided by the guiding of the piston shank 34 by means of a guide ring 38 mounted with sealing in the body of the master cylinder by means for example of an O-ring seal 45 behind the master cylinder.

An annular duct 33 is formed between the exterior periphery of the piston shank 34 and the body of the master cylinder 2 allowing brake fluid to pass between the supply chamber 14 and the supply duct 24.

In the rest position, the hydraulic piston 10 bears at rest against a thrust ring 42 forming a stop and mounted between the guide ring 38 and the body of the master cylinder 2.

In its central part, the piston has a passage 11 placing, at rest, the supply chamber 14 and the work chamber 16 in communication and comprising a valve device 18 interrupting the communication between the chambers 14 and 16 during a braking action.

The valve device 18 is the same as the one described previously for the master cylinder of the prior art depicted in FIGS. 1 and 2.

An elastic return means 17 for returning the piston 10 to the rest position is mounted in compression between a front face 19 of the piston 10 and a front end (not depicted) of the work chamber 16.

The body of the master cylinder also comprises hydraulic damping means 48 comprising an exhaust duct 50 placing the supply chamber 14 and the supply duct 24 in communication and a means 41 of shutting off a second longitudinal rear end 39 of the supply duct 24 which is the opposite end to a first longitudinal end 37 connected with sealing to the reservoir of brake fluid.

In the example depicted, the shut-off means 41 is formed by a front face 46 of the thrust ring 42 arranged more or less with sealing against the body of the master cylinder 10.

It is of course conceivable to provide a means 41 of shutting off the rear end 39 of the supply duct 24 that differs from the thrust ring and that is interposed between the thrust ring of the piston head 32 and the body of the master cylinder. This comment is also true of all the embodiments of a master cylinder according to the present invention.

The exhaust duct 50 is made more or less at right angles to the axis X made between the thrust ring 42 and a resupply duct 44, and more or less at right angles to the axis X in a wall 52 separating the supply chamber 14 from the supply duct 24. The exhaust duct 50 is of small diameter compared with the diameter of the resupply duct 44. The diameter of the duct 50 is advantageously between 0.1 mm and 1 mm, and preferably equal to 0.7 mm.

The diameter of the resupply duct 44 is advantageously between 2 mm and 4 mm and preferably equal to 2.5 mm.

Figure 3A:
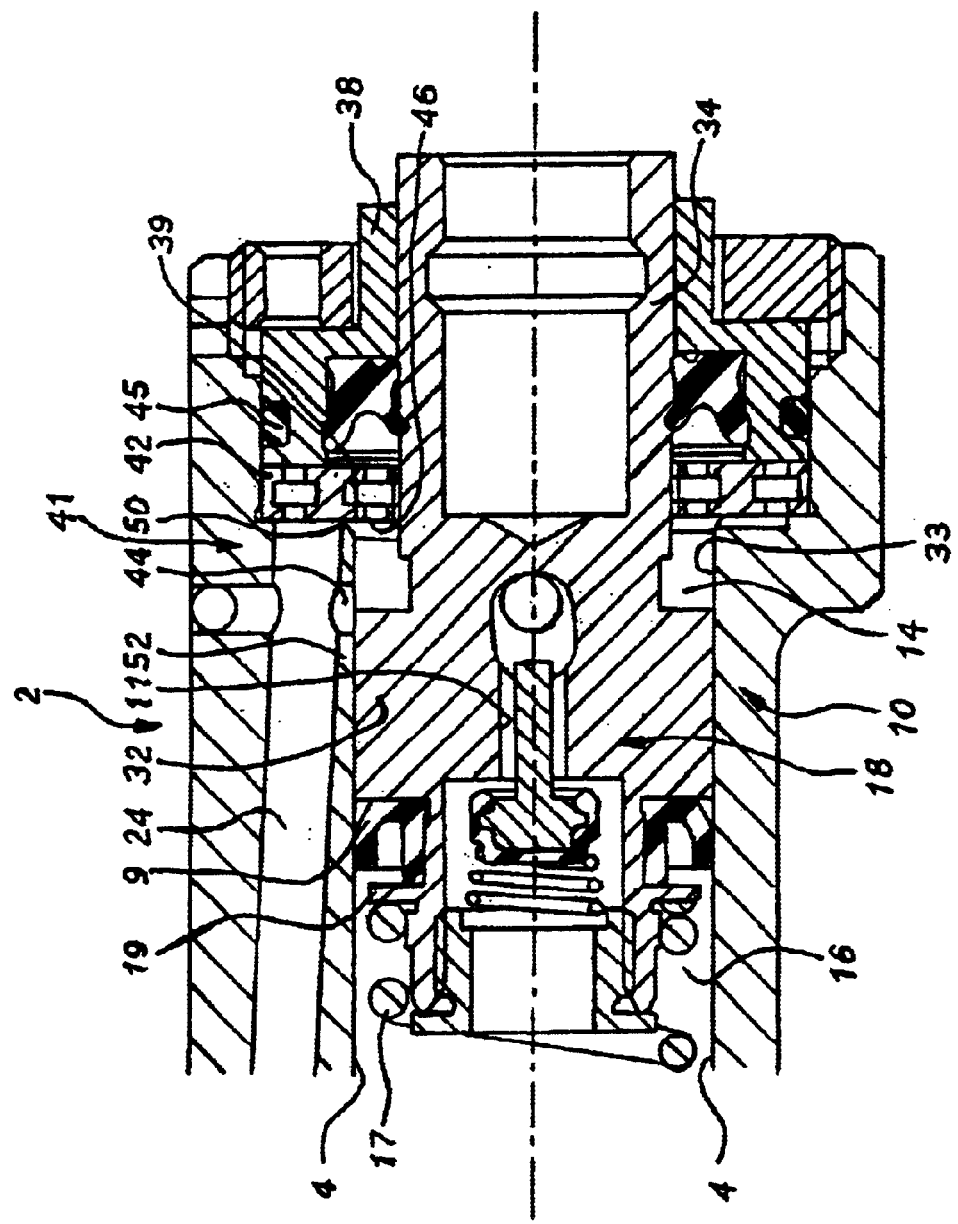
FIGS. 3A to 3C are detailed views in longitudinal section of a second example of a first embodiment of a master cylinder according to the present invention, depicted respectively in successive positions of the primary piston, during the braking phase, at the end of braking, and at rest.
Figure 3B:
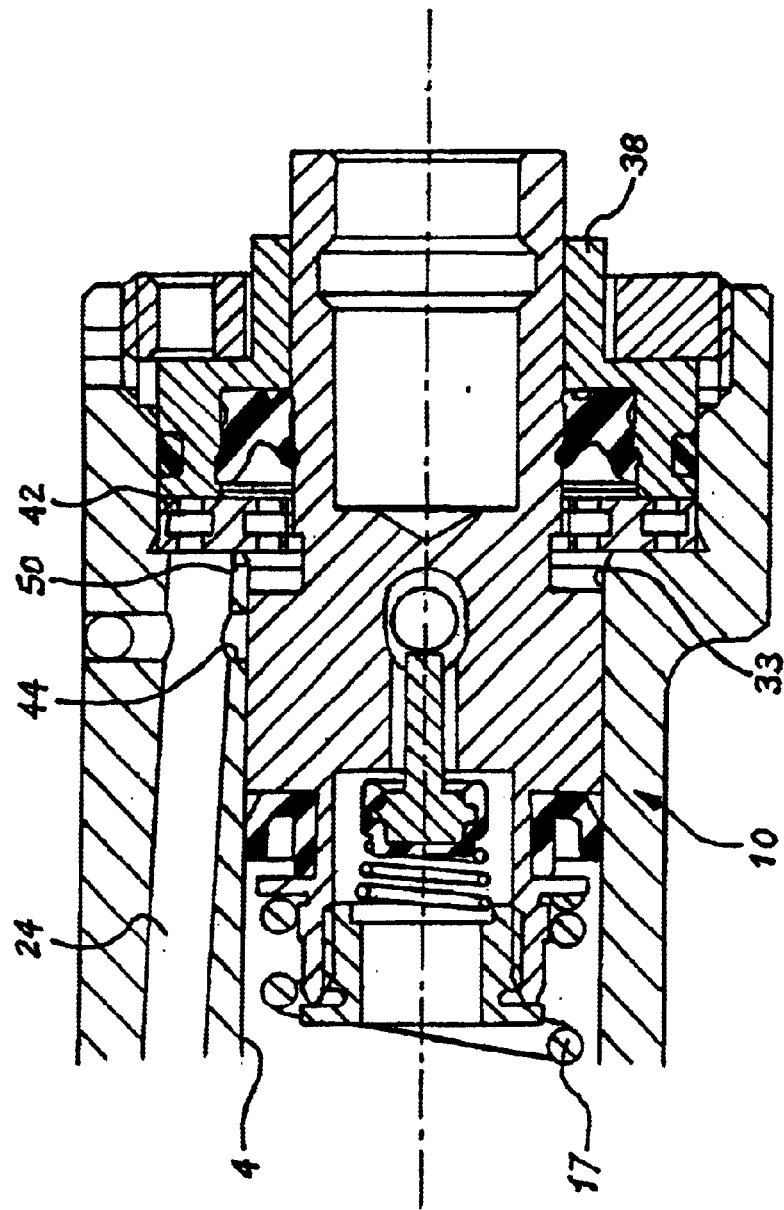
Figure 3C:
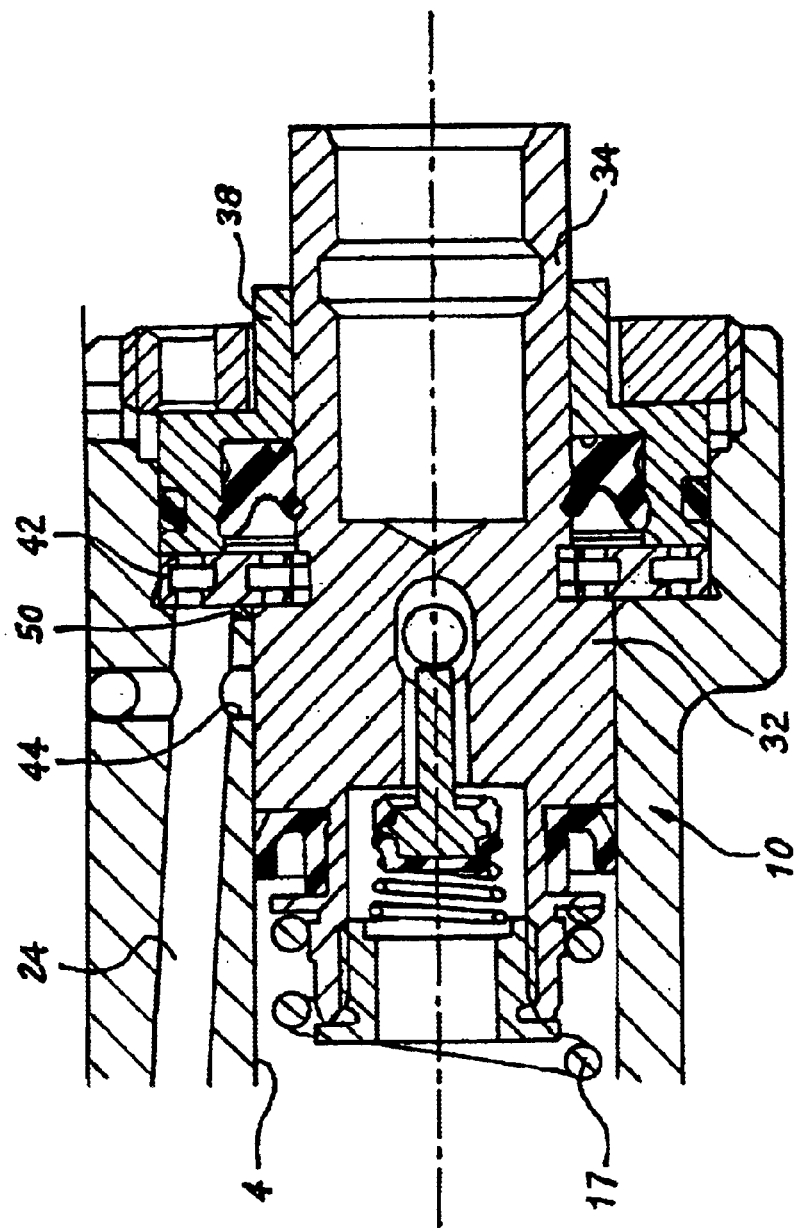

FIGS. 3a, 3b and 3c show a detail of a second example of the first embodiment of a master cylinder according to the present invention in which the hydraulic damping means 48 are formed by a duct 50 roughly perpendicular to the axis X made between the thrust ring 42 and the resupply duct 44 and more particularly to the longitudinal rear end 39 of the supply duct 24 in a wall 52 separating the supply chamber 14 from the supply duct 24, the wall of the duct being formed, in the case of a first transverse part, by the body 10 of the master cylinder and, in the case of a second transverse part, by the front face 46 of the thrust ring 42 and placing the supply chamber 14 and the supply duct 24 in communication. The exhaust duct 50 is of small diameter by comparison with the diameter of the resupply duct 44. The diameter of the duct 50 is advantageously between 0.1 mm and 1 mm and preferably equal to 0.7 mm.

The diameter of the resupply duct 44 is advantageously between 2 mm and 4 mm and preferably equal to 2.5 mm.

We shall now explain the return of the piston 10 to the rest position resting against the thrust ring 42 silently in the case of the first embodiment of a master cylinder according to the present invention.

During a brake release phase, the driver releases his action on the brake pedal and, under the action of the piston return spring, the primary hydraulic piston 10 retreats toward the thrust ring. As the hydraulic piston 10 returns, the brake fluid contained in the supply chamber is driven toward the reservoir mainly through the annular duct 33 and the resupply duct 44, and subsidiarily by the exhaust duct 50 (FIGS. 2a and 3a) until the exterior periphery of the hydraulic piston 10 almost sealingly covers the resupply duct 44 (FIGS. 2b and 3b). The brake fluid then flows from the supply chamber 14 to the suppler duct 24 through the annular duct 33 and the exhaust duct 50. Because of the small diameter of the duct 50, the rate of flow of brake fluid toward the supply duct 24 is very low and therefore slows the return of the hydraulic piston 10 toward the thrust ring and therefore reduces the noise of contact between the primary hydraulic piston and the thrust ring (FIGS. 2c and 3c). This exhaust duct has the advantage of being simple to manufacture because all that is needed is for a transverse duct to be machined, and this entails no special manufacturing means.

Figure 4:
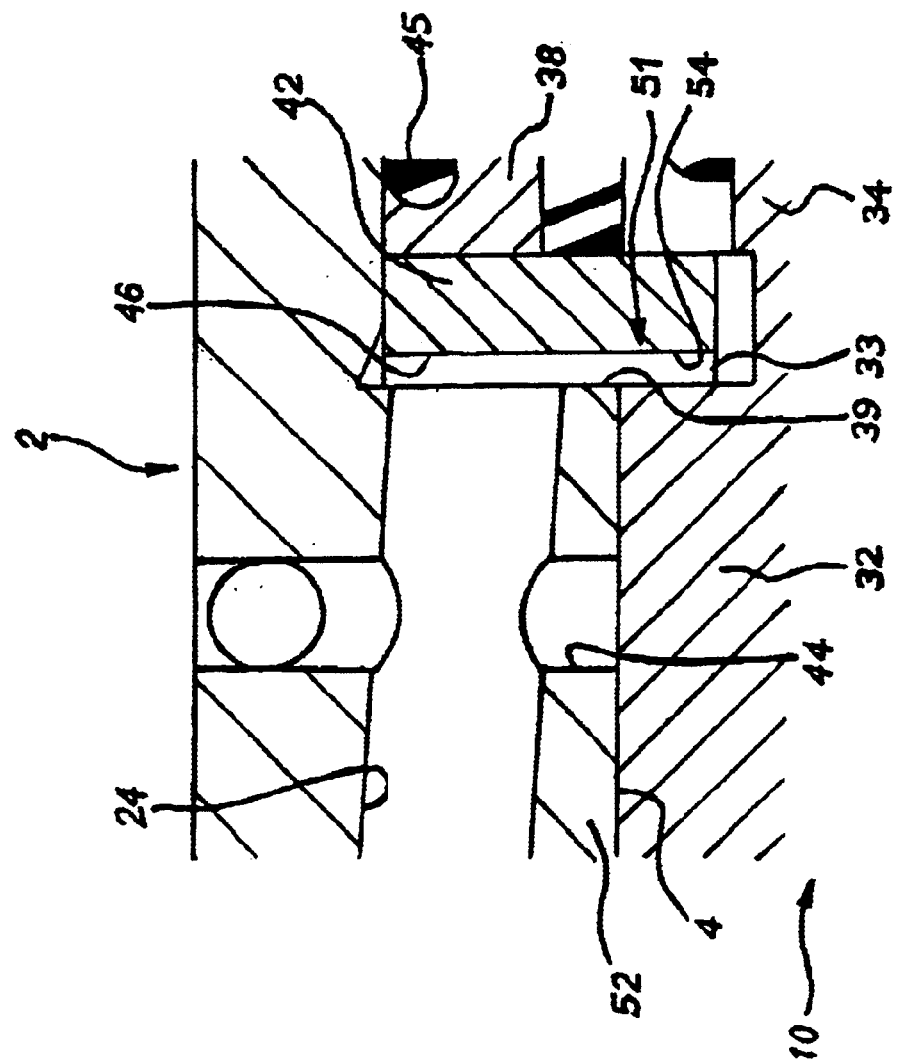
FIG. 4 is a detailed view in longitudinal section of an example of a second embodiment of a master cylinder according to the present invention.

FIG. 4 shows a detail of a second embodiment of a master cylinder according to the present invention, comprising a body 2 of longitudinal axis X pierced with a bore 4 in which there is mounted to slide with sealing at least one hydraulic piston 10 actuated by an actuating rod connected to a brake pedal (neither depicted). The sliding of the piston 10 is sealed for example by means of a lip seal (not depicted) mounted fixedly on a front end of the piston 10. The piston 10 dividing the bore 4 into a supply chamber (not depicted) supplied with brake fluid by a brake fluid reservoir (not depicted) by means of a supply duct 24, and a supply work chamber (not depicted) in communication in normal operation with brakes arranged at the wheels (not depicted). Toward the front the piston 10 has a piston head 32 and toward the rear it has a piston shank 34, the sliding of the piston 10 being guided by the guiding of the piston shank 34 by means of a guide ring 38 mounted with sealing in the body of the master cylinder by means for example of an O-ring seal 45 behind the master cylinder.

A variable-volume duct 33 is formed between the exterior periphery of the piston shank 34 and the body of the master cylinder 2 and allowing the brake fluid to pass between the supply chamber and the supply duct 24.

In the rest position, the hydraulic piston 10 bears at rest against a thrust ring 42 forming a stop and mounted between the guide ring 38 and the body of the master cylinder 2.

The master cylinder also comprises hydraulic means 51 of damping the return of the piston 10 to the position of rest bearing against the thrust ring 42, comprising at least one exhaust duct or groove 54 made more or less radially in the face 46 of the thrust ring 42 and a means 41 of shutting off a second longitudinal rear end 39 of the supply duct 24 which is the opposite end to a first end 37 that is connected to the brake fluid reservoir. It is advantageous to provide a thrust ring comprising a face 46 which has several grooves 54, so as to simplify the orientating of the thrust ring when fitting it in the body of the master cylinder.

The shut-off means 41 is formed by a front face 46 of the thrust ring 42 pressed with more or less sealing against the rear longitudinal end 39 of the supply duct 24.

In its central part the piston comprises a passage at rest placing the supply chamber 14 and the work chamber 16 in communication and comprising a valve device interrupting communication between the chambers 14 and 16 during a braking action.

An elastic return means (not depicted) for returning the piston 10 to the rest position is mounted in compression between a front face 19 of the piston 10 and a front end (neither face nor end is depicted) of the work chamber.

The body of the master cylinder also comprises a resupply duct 44 more or less perpendicular to the axis X and able to place the supply duct 24 and the supply chamber in communication.

We are now going to explain the return of the piston 10 to the rest position bearing against the thrust ring 42 silently for the second embodiment of a master cylinder according to the present invention.

During a brake release phase, the driver releases his action on the brake pedal and, under the action of the piston return spring, the primary hydraulic piston 10 retreats toward the thrust ring. As the hydraulic piston 10 returns, the brake fluid contained in the supply chamber is driven toward the reservoir mainly via the annular duct 33 and the resupply duct 44, until the exterior periphery of the hydraulic piston 10 covers the resupply duct 44 almost with sealing. The brake fluid then flows from the supply chamber toward the supply duct 24 via the annular duct 33 and the exhaust duct 54. Because of the small size of the groove 54, the rate of flow of brake fluid toward the supply duct 24 is very low and consequently slows the return of the hydraulic piston 10 toward the thrust ring 42 and therefore reduces the noise of contact between the primary hydraulic piston and the thrust ring.

An advantage of the present invention is that it is very simple to manufacture because all that is required is that a groove be made on the thrust ring.

Figure 5B:
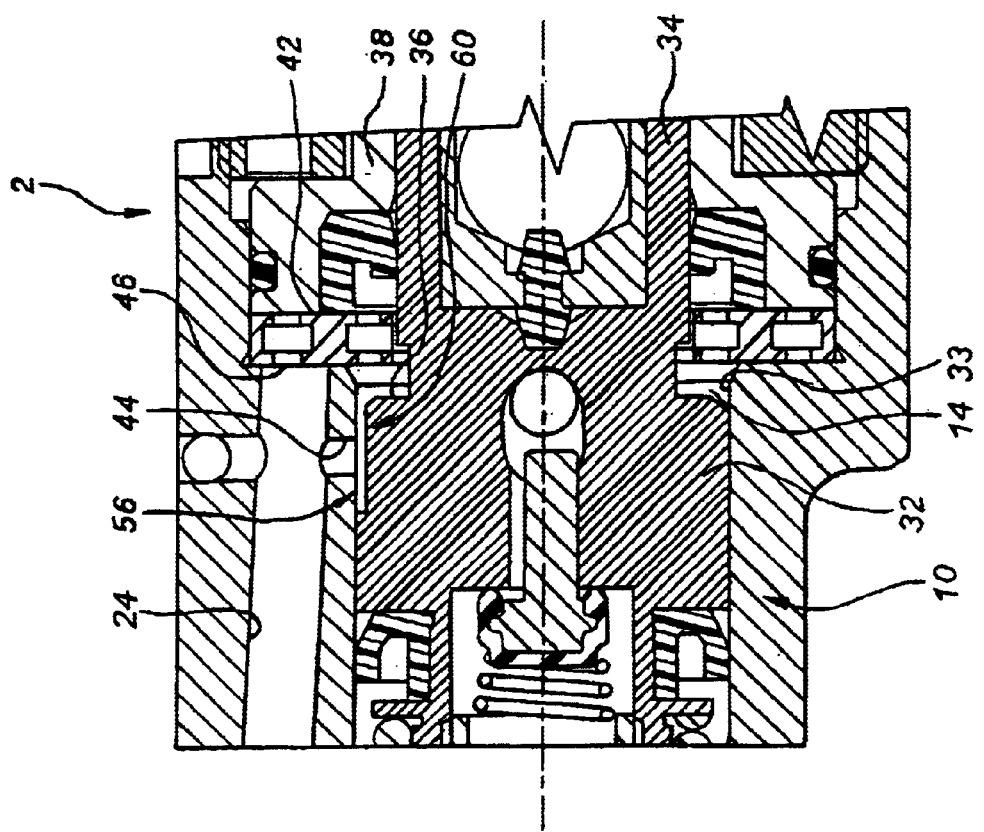
Figure 5C:
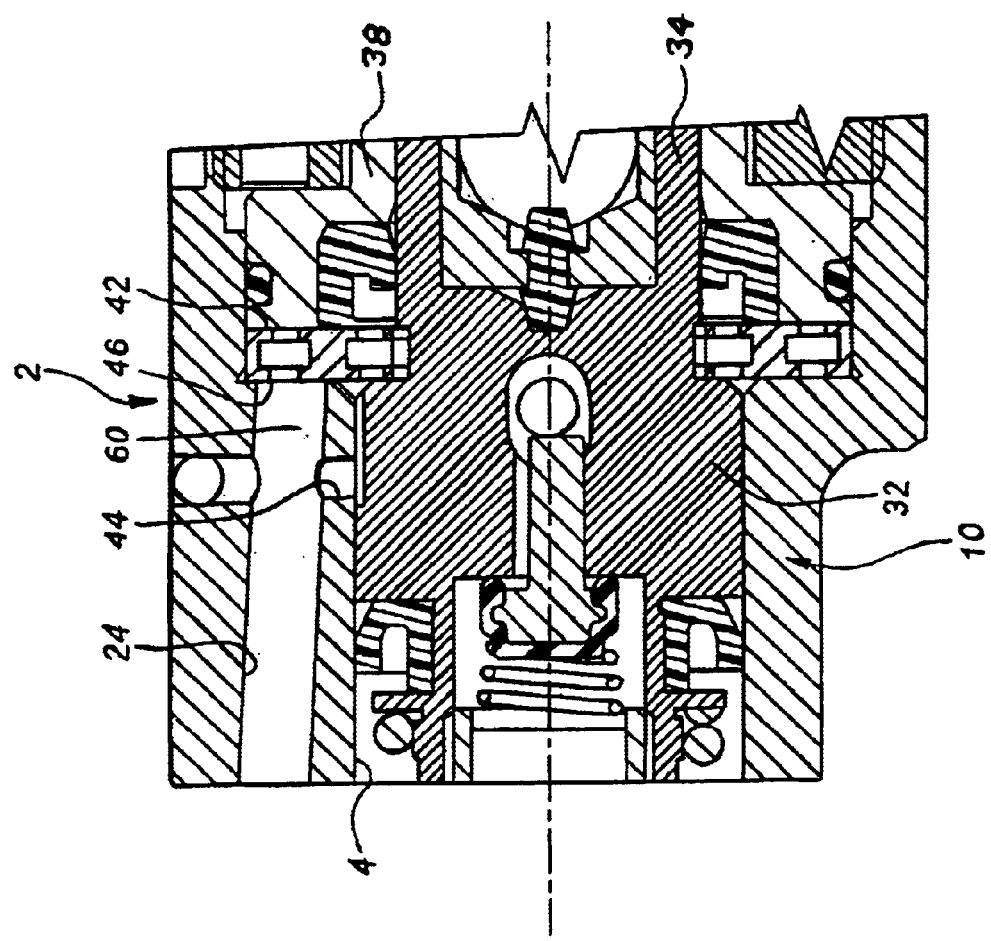

FIGS. 5A, 5B and 5C show a first example of the second embodiment and the preferred embodiment of a master cylinder according to the present invention, comprising a body 2 of longitudinal axis X pierced with a bore 4 in which there is mounted to slide with sealing at least one hydraulic piston 10 actuated by an actuating rod connected to a brake pedal (neither depicted). The sliding of the piston 10 is sealed for example by means of a lip seal 9 mounted fixedly on a front end of the piston 10. The piston 10 dividing the bore 4 into a supply chamber 14 supplied with brake fluid by a brake fluid reservoir (not depicted) by means of a supply duct 24, and a work chamber 16 in communication in normal operation with brakes arranged at the wheels (not depicted). Toward the front the piston 10 has a piston head 32 and toward the rear it has a piston shank 34 connected to the piston head 32 via a shoulder 36, the sliding of the piston 10 being guided by the guiding of the piston shank 34 by means of a guide ring 38 mounted with sealing in the body of the master cylinder by means for example of an O-ring seal 45 behind the master cylinder.

A variable-volume duct 33 is formed between the exterior periphery of the piston shank 34 and the body of the master cylinder 2 and allowing the brake fluid to pass between the supply chamber 14 and the supply duct 24.

In the rest position, the hydraulic piston 10 bears at rest against a thrust ring 42 forming a stop and mounted between the guide ring 38 and the body of the master cylinder 2.

In its central part the piston comprises a passage 11 which, at rest, places the supply chamber 14 and the work chamber 16 in communication and comprising a valve device 18 interrupting the communication between the chambers 14 and 16 during a braking action.

The valve device 18 is the same as the one previously described for the master cylinder of the prior art depicted in FIGS. 1 and 2.

An elastic return means (not depicted) for returning the piston 10 to the rest position is mounted in compression between a front face of the piston 10 and a front end (neither face nor end is depicted) of the work chamber 16.

The body of the master cylinder also comprises a resupply duct 44 more or less perpendicular to the axis X and able to place the supply duct 24 and the supply chamber 14 in communication.

The primary piston 10 also comprises hydraulic damping means 56 for damping the end of travel of the piston 10 as it comes back to bear against the thrust ring 42 via the shoulder 36 of the piston 10. The damping means 56 comprise a means 41 of shutting off a longitudinal rear end 39 of the supply duct 24 and a cut-out 60 made on the periphery of the piston head 32.

The shut-off means 41 is formed by a front face 46 of the thrust ring 42 pressed more or less with sealing against the rear longitudinal end 39 of the supply duct 24.

The cut-out 60 extends axially from the shoulder 36 in the direction A over a length d at least equal to the distance between the front face 46 of the thrust ring 42 and the resupply duct 44. In the example depicted, this is a flat made on the external periphery of the piston and extending longitudinally from the rear end formed by the shoulder 36 of the piston head 32 toward the front end of the piston. The depth p of the flat 61 is advantageously between 0.1 and 1 mm and preferably between 0.2 and 0.3 mm.

During a brake release phase, the driver releases his action on the brake pedal and, under the action of the piston return spring 17, the primary hydraulic piston 10 retreats toward the thrust ring 42. As the hydraulic piston 10 returns, as long as the shoulder 36 is arranged axially in front of the resupply duct 44, more specifically as long as the annular duct 33 faces the resupply duct 44, the brake fluid contained in the supply chamber flows at a high flow rate D toward the reservoir via the annular duct 33 and the resupply duct 44. Then, when the shoulder 36 moves behind the resupply duct, the flow of brake fluid from the supply chamber to the supply duct 24 takes place at a reduced flow rate d relative to the flow rate D through the duct 33 and the flat, the flat at rest ensuring permanent communication between the supply chamber 14 and the resupply duct 14 and thus allowing the pressure in the braking circuit to be completely released.

Because of the low flow rate d, the return of the hydraulic piston 10 toward the thrust ring 42 is slowed and therefore reduces the noise of contact between the primary hydraulic piston and the thrust ring (FIG. 2c).

Figure 6:
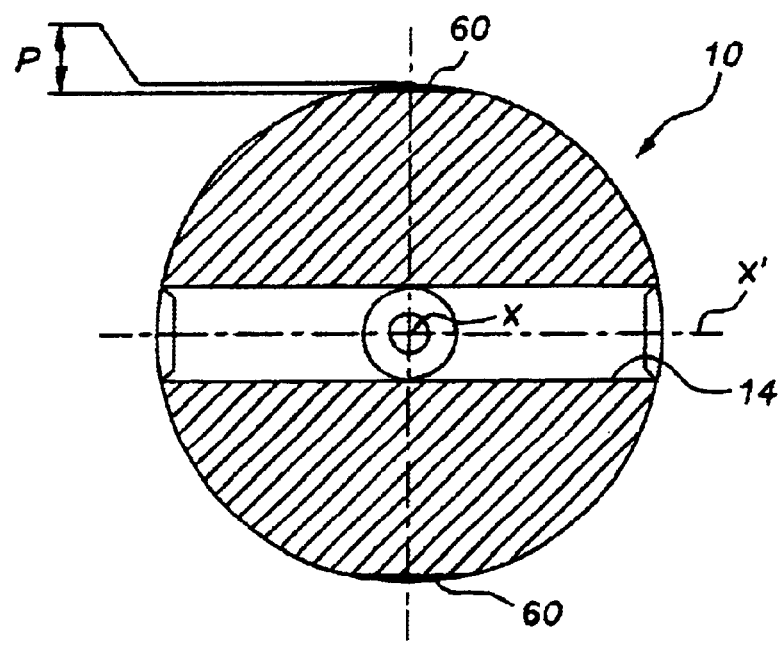
FIG. 6 is a view in cross section of a piston of the master cylinder of FIGS. 5A to 5C.

FIG. 6 shows a cross section of a piston 10 according to the preferred embodiment advantageously comprising two radially opposed flats 60 on the periphery of the piston 10 to simplify the mounting for orientating the flat in the body of the master cylinder.

Of course, a piston comprising more than two flats also forms part of the present invention.

This embodiment has the advantage of entailing only simple machining on the primary piston.

Figure 7:
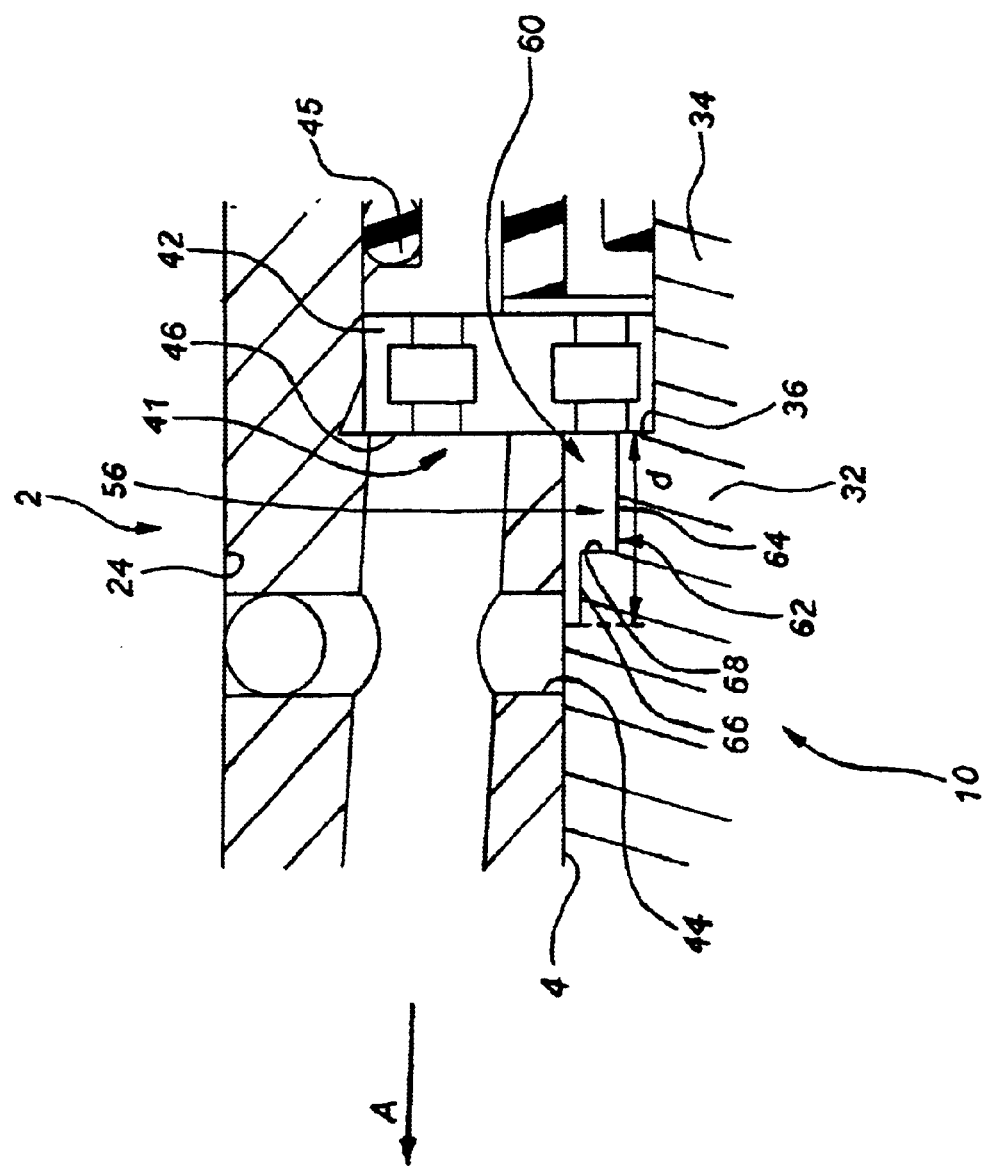
FIG. 7 is a detailed view in longitudinal section of a second example of the third embodiment of a master cylinder according to the present invention.

FIG. 7 shows a second example of the preferred embodiment of a master cylinder according to the present invention comprising a primary piston 10 equipped with hydraulic damping means 56 for damping the end of the return travel of the piston 10 as it comes to bear against the thrust ring 42 via the shoulder 36. The means 56 are formed of a stepped annular cut-out 60 made on the external periphery of the piston head 32 of the piston 10, comprising, toward the rear, a smaller-diameter first part 64 and a larger-diameter second part 66 connected to the first part by a shoulder 68, the cut-out 62 extending from the shoulder 36 toward the front of the piston 10 over a length d at least equal to the distance separating the front face 46 of the thrust ring 42 from the resupply duct 44. The diameter of the larger-diameter second part 66 is smaller than the inside diameter of the bore 4.

The advantage of this example is that it entails only simple machining of the primary piston and that no orientation of the piston is required when the latter is being mounted in the body of the master cylinder.

Figure 8:
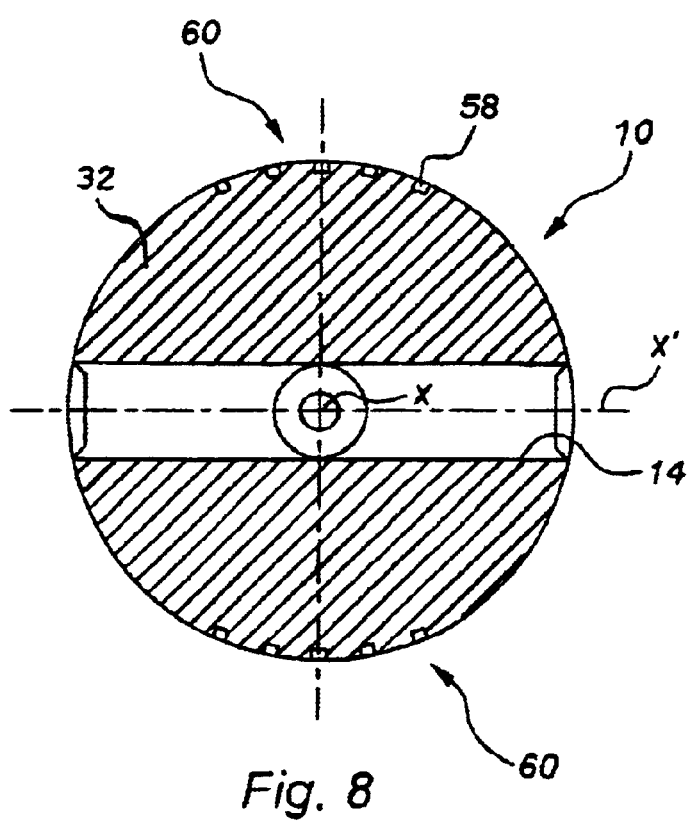
FIG. 8 is a view in cross section of a piston of a third example of the third embodiment of a master cylinder according to the present invention.

FIG. 8 shows a cross-sectional view of a piston 10 according to a third example of the preferred embodiment of a master cylinder according to the present invention comprising a cut-out 60 formed of at least one longitudinal duct 58 of small cross section made in the body of the piston 10 on the external periphery of the piston head 32 of the piston 10 and extending from the shoulder 36 toward the front of the piston 110 over a length d at least equal to the distance between the front face 46 of the thrust ring 42 and the resupply duct 44.

The passage 58 is made more or less at right angles to the axis X' of the supply chamber 14.

The piston advantageously comprises several ducts 58 almost uniformly distributed about an axis perpendicular to the axis X', and even more advantageously, two sets of grooves that are radially opposed with respect to the longitudinal axis of the piston 10. In the example depicted, the piston comprises two sets of five ducts uniformly angularly distributed over two angularly opposed portions of the periphery of the piston head 32.

Figure 9A:
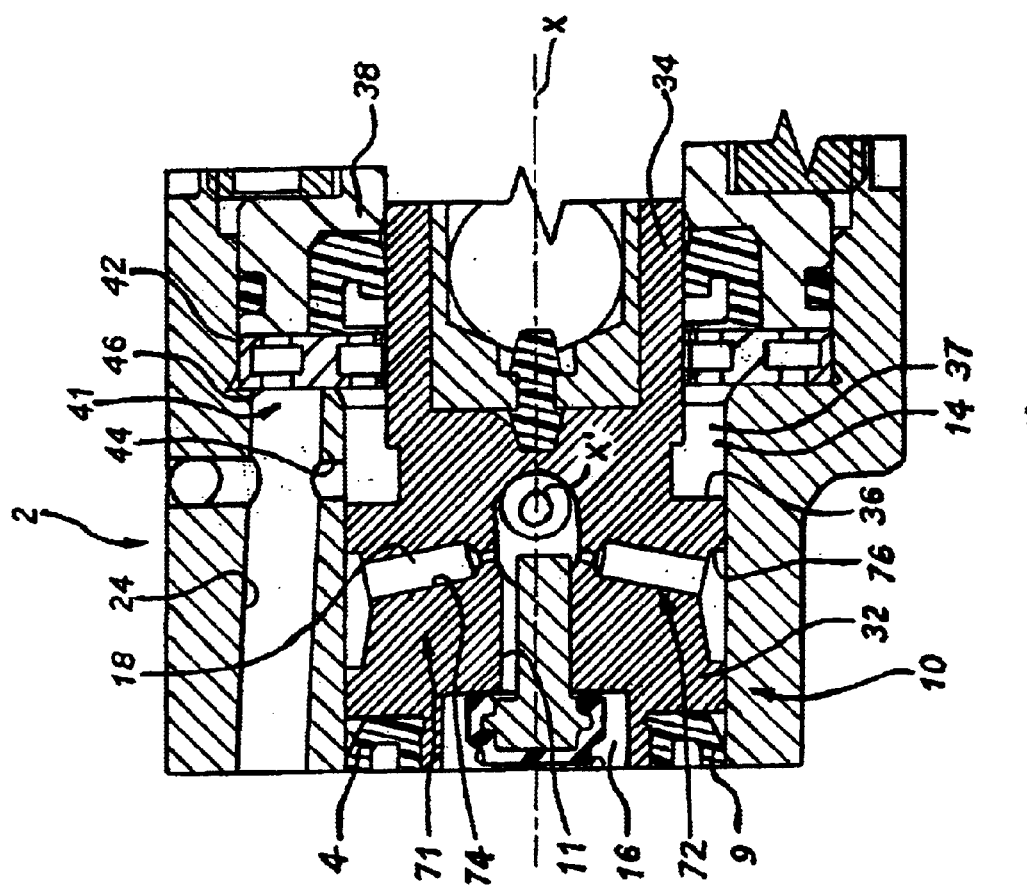
FIGS. 9A, 9B and 9C are detailed views in longitudinal section of a fourth embodiment of a master cylinder according to the present invention, depicted respectively in successive positions of the primary piston, during the braking phase, at the end of braking, and at rest.
Figure 9B:
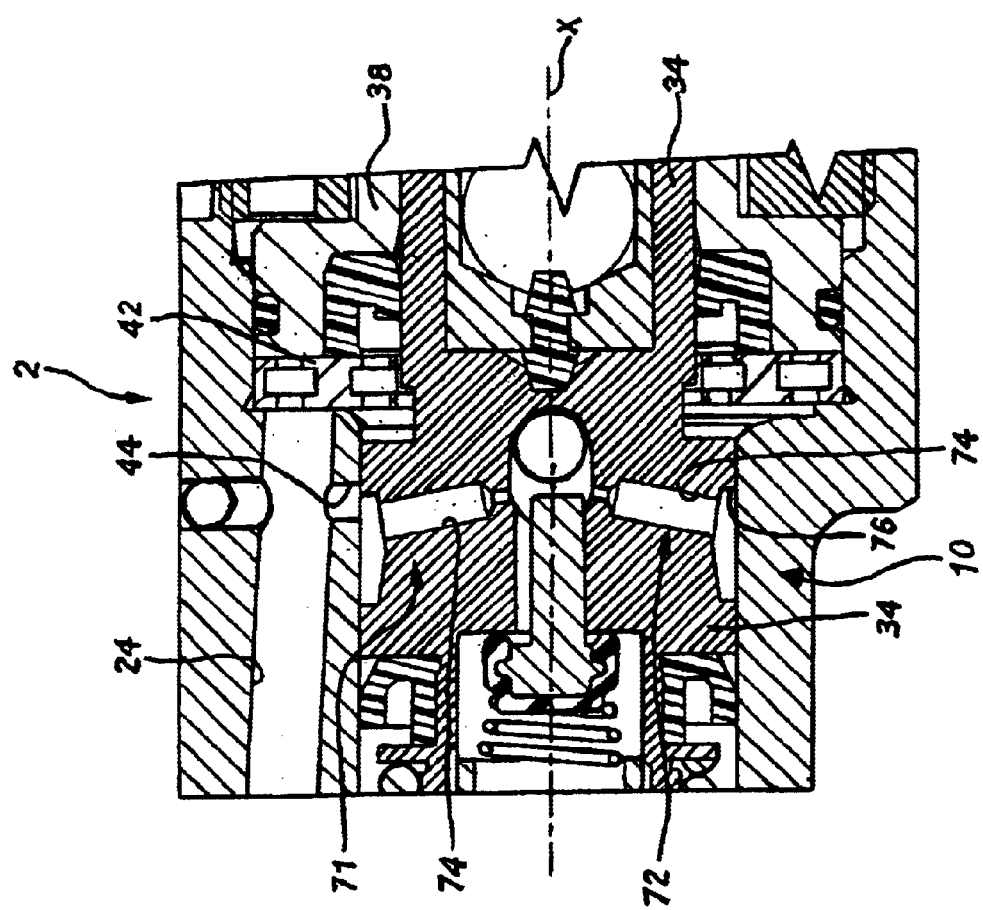
Figure 9C:
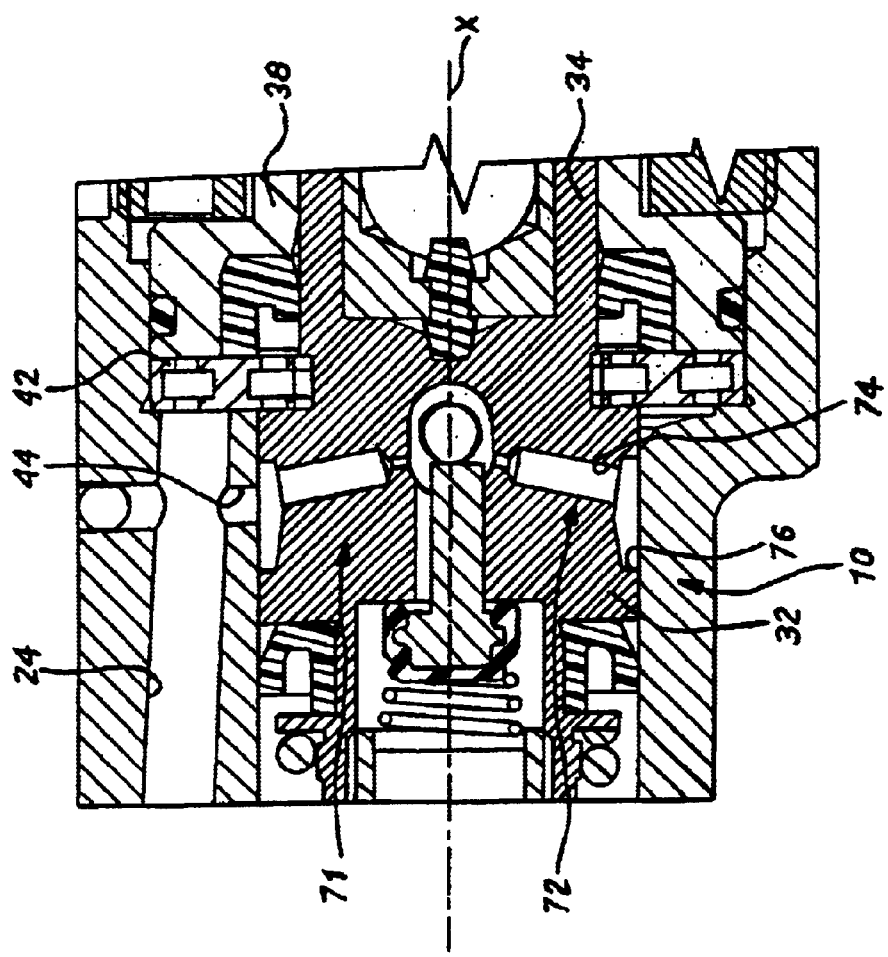

FIGS. 9A, 9B and 9C show a fourth embodiment of a master cylinder according to the present invention, comprising a body 2 of longitudinal axis X pierced with a bore 4 in which there is mounted to slide with sealing at least one hydraulic piston 10 actuated by an actuating rod connected to a brake pedal (neither depicted). The sliding of the piston 10 is sealed for example by means of a lip seal 9 mounted fixedly on a front end of the piston 10. The piston 10 dividing the bore 4 into a supply chamber 14 supplied with brake fluid by a brake fluid reservoir (not depicted) by means of a supply duct 24, and a work chamber 16 in communication in normal operation with brakes arranged at the wheels (not depicted). Toward the front the piston 10 has a piston head 32 and toward the rear it has a piston shank 34, the sliding of the piston 10 being guided by the guiding of the piston shank 34 by means of a guide ring 38 mounted with sealing in the body of the master cylinder by means for example of an O-ring seal 45 behind the master cylinder.

A variable-volume duct 33 is formed between the exterior periphery of the piston shank 34 and the body of the master cylinder 2 and allowing the brake fluid to pass between the supply chamber 14 and the supply duct 24.

In the rest position, the hydraulic piston 10 bears at rest against a thrust ring 42 forming a stop and mounted between the guide ring 38 and the body of the master cylinder 2.

In its central part the piston comprises a passage 11 of axis X which, at rest, places the supply chamber 14 and the work chamber 16 in communication and comprising a valve device 18 interrupting the communication between the chambers 14 and 16 during a braking action.

The valve device 18 is the same as the one previously described for the master cylinder of the prior art depicted in FIGS. 1 and 2.

An elastic return means (not depicted) for returning the piston 10 to the rest position is mounted in compression between a front face of the piston 10 and a front end (neither face nor end is depicted) of the work chamber 16.

The body of the master cylinder also comprises a resupply duct 44 more or less perpendicular to the axis X and able to place the supply duct 24 and the supply chamber 14 in communication.

The primary piston 10 also comprises hydraulic damping means 71 comprising a means 41 of shutting off a second rear longitudinal end 39 of the supply duct 24 and at least one passage 72 intended to allow the brake fluid to flow at reduced flow rate by comparison with the flow through the duct 33 formed between the periphery of the piston shank 34 and the body of the master cylinder, from the supply chamber 14 to the supply duct 24.

The shut-off means 41 is formed by a front face 46 of the thrust ring 42 applied almost with sealing against the rear longitudinal end 39 of the supply duct 24.

The passage 72 is formed for example by a bore 74 made more or less radially in the body of the piston 10 and advantageously forming an angle with the normal to the axis X, directed toward the front of the piston 10. The bore 74 places in communication the passage 11 and the external periphery of the piston 10, and in consequence, the supply chamber 14 and the supply duct 24 via the resupply duct 44. The bore 74 advantageously opens into a pan 76 made in the external periphery of the piston 10.

The piston advantageously has two radially opposed passages 72 making it possible to reduce the time taken to orientate the piston 10 when mounting it in the body of the master cylinder. The pans 76 are advantageously formed by an annular groove.

During a brake release phase, the driver releases his action on the brake pedal and, under the action of the piston return spring, the primary hydraulic piston 10 retreats toward the thrust ring. As the hydraulic piston 10 returns, the brake fluid contained in the supply chamber 14 flows with a flow rate D toward the reservoir mainly through the duct 33 and the resupply duct 44 (FIG. 9A) until the exterior periphery of the hydraulic piston 10 covers the resupply duct 44 almost with sealing (FIG. 9B). The brake fluid then flows from the supply chamber 14 to the supply duct 24 through the duct 33, the bore 74 and the pan 76 at a lower flow rate d by comparison with the flow rate D. In consequence, the return of the hydraulic piston 10 toward the thrust ring 42 is slowed and thus the noise of contact between the primary hydraulic piston and the thrust ring is reduced (FIG. 9C).

Figure 10:
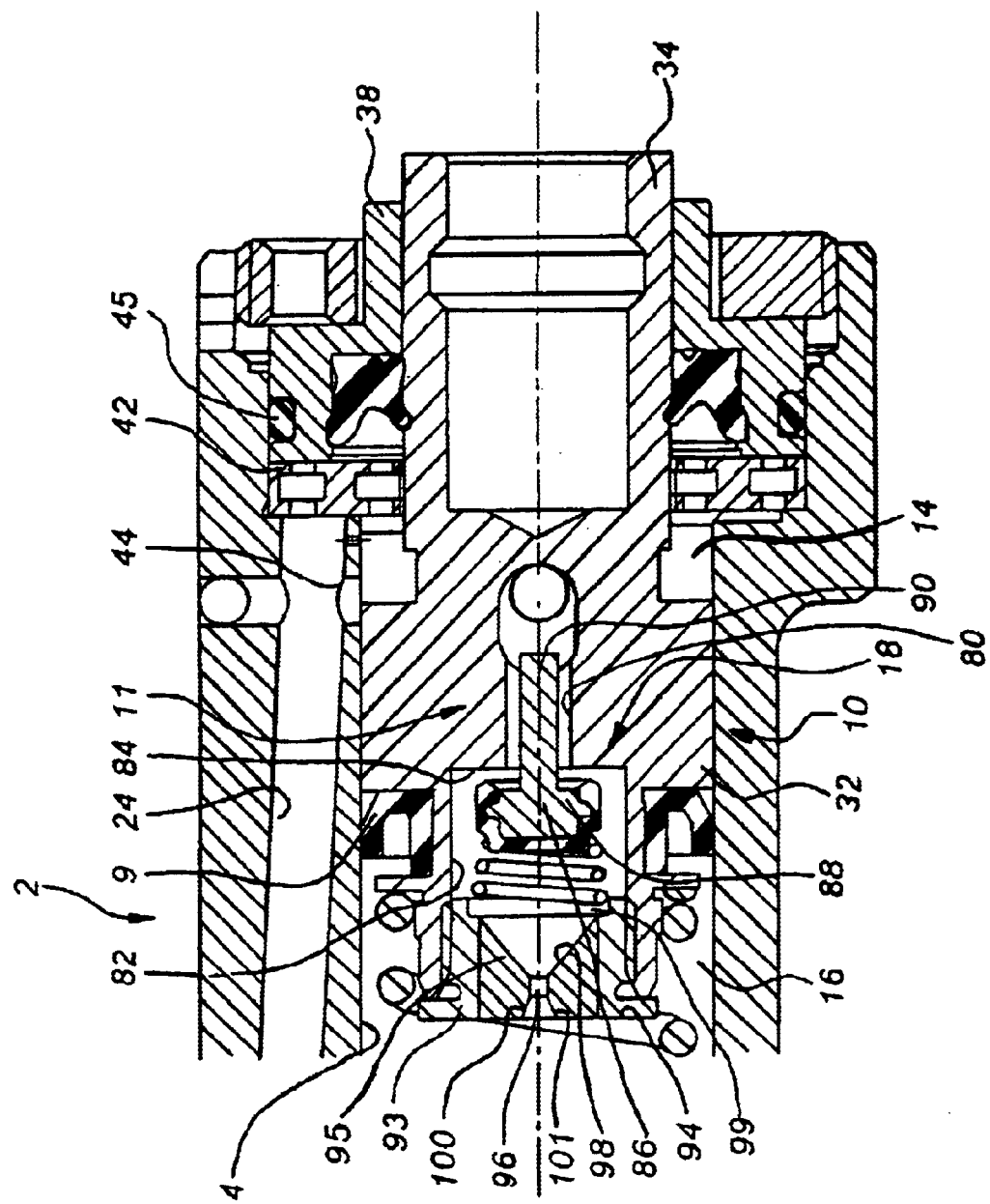
FIG. 10 is a detailed view in longitudinal section of a fifth embodiment of a master cylinder according to the present invention.

FIG. 10 shows a fifth embodiment of a master cylinder according to the present invention allowing an improvement in the effectiveness of the first hydraulic damping means as depicted in FIGS. 2 to 9 in the case of the valve that separates the supply chamber and the work chamber being opened during a braking phase as a result of excess pressure in the supply chamber. The opening of the valve, and consequently the escape of the fluid from the supply chamber in the direction of the work chamber, is likely to reduce the effectiveness of the first hydraulic damping means according to the present invention. Consequently the first hydraulic damping means are advantageously associated with the second hydraulic damping means.

The master cylinder according to the fifth embodiment comprises a body 2 pierced with a bore 4 in which there is mounted to slide with sealing at least one hydraulic piston 10 actuated by an actuating rod connected to a brake pedal (neither depicted). The sliding of the piston 10 is sealed for example by means of a lip seal 9 mounted fixedly on a front end of the piston 10. The piston 10 dividing the bore 4 into a supply chamber 14 supplied with brake fluid by a brake fluid reservoir (not depicted) by means of a supply duct 24, and a work chamber 16 in communication in normal operation with brakes arranged at the wheels (not depicted). Toward the front the piston 10 has a piston head 32 and toward the rear it has a piston shank 34, the sliding of the piston 10 being guided by the guiding of the piston shank 34 by means of a guide ring 38 mounted with sealing in the body of the master cylinder by means for example of an O-ring seal 45 behind the master cylinder. In the rest position, the hydraulic piston 10 bears at rest against a thrust ring 42 forming a stop and mounted between the guide ring 38 and the body of the master cylinder 2.

The master cylinder comprises first hydraulic damping means as depicted in FIGS. 2A, 2B and 2C.

In its central part, the piston comprises a passage 11 at rest placing the supply chamber 14 and the work chamber 16 in communication and comprising a valve device 18 interrupting the communication between the chambers 14 and 16 during a braking action.

The passage 11 is formed orientated from the supply chamber 14 toward the work chamber 16 by a smaller-diameter first bore 80, a larger-diameter second bore 82, the first bore 80 being connected to the second bore 82 by a shoulder 84 forming a valve seat for the valve device 18 and collaborating with a shutter 86 equipped with a head 88 arranged in the bore 82 shutting off the bore 80 and with a stem 90 for controlling the opening of the valve which stem is slidably mounted in the first bore 80. The valve device 18 also comprises a spring 30 for returning the shutter to the closed position, the spring 30 being mounted in compression between the head 88 and a thrust element 94 mounted fixedly at the front end of the bore 82, for example by screwing, and allowing the fluid to pass between the supply chamber 14 and the work chamber 16.

The thrust element 94 advantageously comprises second hydraulic damping means 95 formed of a shut-off piece 93 comprising a through duct 96 of very small cross section relative to the cross section of the bore 82, therefore allowing flow only at a very low rate.

The through duct is formed, for example, of first and second cones 98, 100 of axis X connected by their vertex formed, the first cone 98 of larger base 99 oriented backward and of greater height H and the second cone 100 of smaller base 101 oriented forward and of smaller height h, the passage cross section of the duct 96 then being determined by the intersection of the cones 98 and 100.

Of course, the shut-off piece forming the second hydraulic damping means is not necessarily borne by the thrust element 94 of the means of returning the valve 18.

It is also possible to anticipate a valve shutter return spring with a load higher, for example four times as high as, the load on the spring used in the known way, for example 8 Newtons, so as to reduce the risks of inadvertent valve openings.

Thus, as the piston returns to the rest position bearing against the thrust ring 42, when the valve device opens the brake fluid contained in the supply chamber 14, whose flow toward the supply duct is at a reduced flow rate through the duct 50, has a tendency to try to flow into the work chamber 16 through the duct 96 but, because of the reduced cross section of the duct 96, the flow of brake fluid toward the work chamber 16 is also at a low flow rate and contributes to the slowing of the piston 10 at the end of its travel.

Of course it is also advantageous to combine the second hydraulic damping means 95 with any one of the first damping means according to the first or second or third or fourth embodiments of a master cylinder according to the present invention.

The master cylinder according to the present invention is particularly advantageous for an electro-hydraulic braking system, although it is perfectly well suited to a conventional braking system in which the pressurized brake fluid in normal operation is supplied to the brakes at the wheels directly by the master cylinder rather than by a hydraulic pump.

Figure 11:
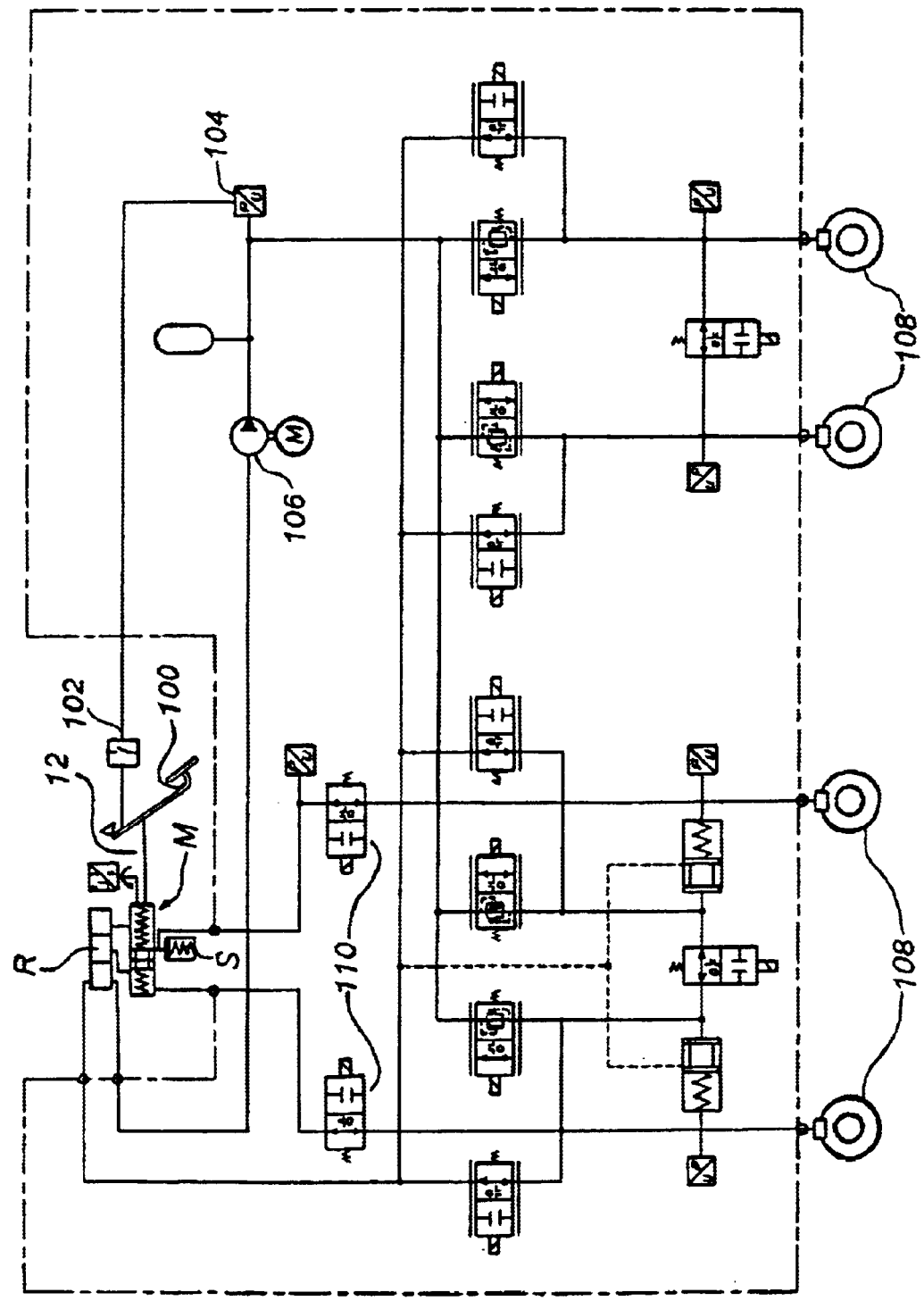

FIG. 11 shows an electro-hydraulic braking system comprising a master cylinder M according to the present invention, comprising means of simulating the reaction of the brake circuit, the master cylinder is actuated by the actuating rod 12 connected to a brake pedal 100 intended to be moved by the driver, means 102 of detecting the movement of the brake pedal 100 and/or of the actuating rod 12, for example displacement sensors, a computer 104 producing a command on the basis of the information supplied by the detection means 102, the said command being transmitted to a hydraulic pump 106 which draws brake fluid from the reservoir R and sends it under pressure to the brakes 108 at the wheels. The computer 104 also controls electrically operated valves 110 which, in normal operation, interrupt the communication between the master cylinder M and the brakes 108, and so the master cylinder is used only to simulate, for the driver, the reaction of the braking circuit. At rest, that is to say outside of a phase in which the brakes are being actuated by control by the computer, the electrically operated valves 110 are open and so in the event of the computer 104 or the pump 106 for example malfunctioning, the master cylinder is in communication with the brakes 108 and the depressing of the brake pedal 100 by the driver controlling the master cylinder M by means of the actuating rod 12, allows pressurized brake fluid to be sent to the brakes 108 and therefore allows the vehicle to be braked.

There has indeed been achieved a master cylinder with a low level of operating noise which is simple to produce and quick to assemble.

The present invention applies in particular to the motor industry.

The present invention applies in particular to the motor vehicle braking industry and in particular to the private car braking industry.

We claim:

1. A master cylinder havign a body with a longitudinal axis (X) pierced with a bore along the axis (X), and at least one piston (10) mounted to sealingly slide within said bore, said piston (10) comprising a piston head (32) with a piston shank (34) connected to the piston head (32) via a shoulder (36), said piston shank (34) being guided by a guide ring (38) mounted fixedly in said body, said piston head (32) coming at rest and bearing against a thrust ring (42) via the shoulder (36), said piston (10) having a body that delimits a work chamber (16) from which pressurized brake fluid is communicated to brakes during a brake application and a supply chamber (14) that is placed in communication at rest with said work chamber by a valve device (18) arranged in the body of said piston (10), a supply duct (24) having a first longitudinal end (37) sealingly connected to a brake fluid reservoir and a second longitudinal end (39) located adjacent said thrust ring (42) and allowing the supply chamber (14) to be supplied with brake fluid via a resupply duct (44) and hydraulic damping means (48) for damping the return of said piston head to bear against the thrust ring (42), characterized in that the hydraulic damping means (48, 51, 56, 71) comprise a means (41) for shutting off said second longitudinal end of the supply duct (24) and at least one exhaust duct (50, 54, 58, 60, 72) that restricts the flow rate of the brake fluid from the supply chamber (14) to the supply duct (24).

2. The master cylinder according to claim 1, characterized in that said shut-off means (41) is formed by a face (46) of said thrust ring (42).

3. The master cylinder according to claim 2, characterized in that said damping means (48) comprise a longitudinal cut-out (60) made on the external periphery of said piston head (32) and in that said cut-out (60) extends over the exterior periphery of the piston head (32) starting from said shoulder (36) on the piston (10) over a distance at least equal to the length between a face (46) of said thrust ring (42) a position that comes into contact with said piston (10) and said resupply duct (44).

4. The master cylinder according to claim 3, characterized in that said cut-out (60) is formed of at least one flat.

5. The master cylinder according to claim 4, characterized in that said piston (61) comprises two radially opposed flats.

6. The master cylinder according to claim 5, characterized in that each of said flats has a depth of between 0.1 mm and 1 mm.

7. The master cylinder according to claim 3, characterized in that said cut-out (60) is formed of at least one longitudinal duct (58).

8. The master cylinder according to claim 7, characterized in that said cut-out (60) is formed of five longitudinal ducts (58) that are uniformly angularly distributed over a portion of the periphery of said piston head (32).

9. The master cylinder according to claim 8, characterized in that said cut-out (60) is formed of two sets of five ducts (58) which are radially opposed.

10. The master cylinder according to claim 3, characterized in that said cut-out (60) is formed by a variation (64, 66, 68) of the diameter of a portion of said piston head (32).

11. The master cylinder according to claim 10, characterized in that said cut-out (60) has at least two sections (64, 66) the diameters that increase in the direction toward the opposite end of the piston head (32) to the longitudinal end of the piston head that is connected to the piston shank (34).

12. The master cylinder according to claim 1, characterized in that the hydraulic damping means (71) comprise a roughly radial duct (72) connecting the supply chamber (14) and the exterior periphery of the piston head (32), said radial said duct (72) opening more or less facing the resupply duct (44) when the piston head (32) is bearing against the thrust ring (42).

13. The master cylinder according to claim 12, characterized in that said radial duct (72) opens into a pan (76) made on the exterior periphery of said piston (10).

14. The master cylinder according to claim 1, characterized in that the damping means (48, 51) comprise an exhaust duct (50, 54) arranged along the longitudinal axis (X) and located between the supply chamber (14) and the supply duct (24), and being at a right angle to the axis of the master cylinder (X) between the resupply duct (44) and the shut-off means (41) and having a diameter that is markedly smaller than the diameter of the resupply duct (44).

15. The master cylinder according to claim 14, characterized in that the diameter of said exhaust duct (50) is between 0.1 mm and 1 mm, and in that said diameter of the resupply duct is between 2 mm and 4 mm.

16. The master cylinder according to claim 15, characterized in that said exhaust duct (50) is made in the body of the master cylinder and part of which is formed by said shut-off means (41).

17. The master cylinder according to claim 14, characterized in that said damping means (51) comprise a duct formed by a radial groove (54) made on a face (46) of the thrust ring (42) at rest in contact with the piston (10) facing the second longitudinal end (39) of the supply duct (24).

18. The master cylinder according to claim 1, characterized by a second hydraulic damping means (95) arranged between the work chamber (16) and the supply chamber (14).

19. The master cylinder according to claim 18, characterized in that said second hydraulic damping means (95) is formed by a shut-off piece (93) comprising a duct (96) facing a bore (82) for communication between the supply chamber (14) and the work chamber (16), said second means (95) being arranged in the piston head (32) forward of the valve device (18).

20. The master cylinder according to claim 19, characterized in that said shut-off piece (93) forms a thrust piece for a return spring (92) of the master cylinder valve (18).

21. The master cylinder according to claim 19, characterized in that said duct (96) is formed by two cones connected by their vertex (98, 99) along the longitudinal axis (X).

22. The master cylinder according to claim 21, characterized in that in a normal operation, the master cylinder is connected to means for simulating the reaction of a braking circuit, and in a degraded operation, is connected to wheel brakes.

\* \* \* \* \*